(12) United States Patent
Kim et al.

(10) Patent No.: US 11,406,967 B2
(45) Date of Patent: Aug. 9, 2022

(54) HETEROGENEOUS CATALYST, METHOD OF PRODUCING THE HETEROGENEOUS CATALYST, AND METHOD OF PRODUCING LIGNIN-DERIVED HIGH-SUBSTITUTED AROMATIC MONOMER FROM WOODY BIOMASS MATERIAL

(71) Applicant: Research & Business Foundation Sungkyunkwan University, Suwon-si (KR)

(72) Inventors: Jaehoon Kim, Seongnam-si (KR); Jae Yong Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 98 days.

(21) Appl. No.: 16/832,693

(22) Filed: Mar. 27, 2020

(65) Prior Publication Data
US 2020/0306733 A1    Oct. 1, 2020

(30) Foreign Application Priority Data

Mar. 29, 2019    (KR) .......................... 10-2019-0037025

(51) Int. Cl.
*B01J 23/755*    (2006.01)
*B01J 35/00*    (2006.01)
(Continued)

(52) U.S. Cl.
CPC .......... *B01J 23/755* (2013.01); *B01J 35/008* (2013.01); *B01J 35/0086* (2013.01);
(Continued)

(58) Field of Classification Search
CPC .... B01J 23/755; B01J 35/008; B01J 35/0086; B01J 35/023; B01J 37/04; B01J 37/06; B01J 21/18; C08H 8/00
(Continued)

(56) References Cited

U.S. PATENT DOCUMENTS 2,151,329 A * 3/1939 Page ...................... B01J 23/755
                                                            502/335
4,956,328 A * 9/1990 Frohning .............. C07C 209/36
                                                            502/242

(Continued)

FOREIGN PATENT DOCUMENTS

| CN | 103508857 | * | 1/2014 | ............. C07C 41/01 |
| CN | 104744204 | * | 7/2015 | ............. Y02P 20/52 |

(Continued)

OTHER PUBLICATIONS

Jae-Young Kim et al.; "Catalytic depolymerization of lignin macromolecule to alkylated phenols over various metal catalysts in supercritical tert-butanol." Journal of Analytical and Applied Pyrolysis 113, pp. 99-106. (Year: 2015).*

(Continued)

*Primary Examiner* — Patricia L. Hailey
(74) *Attorney, Agent, or Firm* — NSIP Law

(57) ABSTRACT

Disclosed are a heterogeneous catalyst, a production method thereof, and a method for producing a lignin-derived high-substituted aromatic monomer from a woody biomass material using the heterogeneous catalyst. The heterogeneous catalyst includes a carrier; and a Ni—Al nano-particle supported on the carrier.

13 Claims, 34 Drawing Sheets

(51) Int. Cl.
*B01J 37/04* (2006.01)
*C08H 8/00* (2010.01)
*B01J 37/06* (2006.01)
*B01J 35/02* (2006.01)
*B01J 21/18* (2006.01)

(52) U.S. Cl.
CPC ............ *B01J 35/023* (2013.01); *B01J 37/04* (2013.01); *B01J 37/06* (2013.01); *C08H 8/00* (2013.01); *B01J 21/18* (2013.01)

(58) Field of Classification Search
USPC ................ 502/182, 185, 335; 585/240, 242; 977/773
See application file for complete search history.

(56) References Cited

U.S. PATENT DOCUMENTS

| | | | | |
|---|---|---|---|---|
| 2010/0210456 | A1* | 8/2010 | Seals | B01J 31/0274 502/258 |
| 2011/0081585 | A1* | 4/2011 | Montgomery | C25B 5/00 429/415 |
| 2012/0107590 | A1* | 5/2012 | Xu | C01B 32/198 428/220 |
| 2012/0156742 | A1* | 6/2012 | Powell | C10G 3/00 435/155 |
| 2012/0156743 | A1* | 6/2012 | Powell | C10G 3/00 435/155 |
| 2012/0258849 | A1* | 10/2012 | Xi | C22C 38/50 501/127 |
| 2014/0107381 | A1* | 4/2014 | Beckham | B01J 27/236 585/240 |
| 2016/0052949 | A1* | 2/2016 | Beckham | B01J 35/002 568/322 |
| 2019/0092644 | A1* | 3/2019 | O'Hare | C01B 39/20 |
| 2021/0146344 | A1* | 5/2021 | Hwang | B01J 37/088 |

FOREIGN PATENT DOCUMENTS

| | | | | |
|---|---|---|---|---|
| CN | 104843805 | * | 8/2015 | ............ B82Y 30/00 |
| CN | 109225228 | * | 1/2019 | ............ B01J 23/002 |
| JP | 2014-196294 A | | 10/2014 | |

OTHER PUBLICATIONS

Ivan Kristianto et al., "Effective deppolymerization of concentrated acid hydrolysis lignin using a carbon-supported ruthenium catalyst in ethanol/formic acid media." Bioresource Technology 234, pp. 424-431. (Year: 2017).*

Shanmuk Srinivas Ravuru et all, "Synthesis of NiAl-layered double hydroxide with nitrate intercalation: Application in cyanide removal from steel industry effluent." Journal of Hazardous Materials 373, pp. 791-800. (Year: 2019).*

Mikel Oregui-Bengoechea et al., "Thermocatalytic conversion of lignin in an ethanol/formic acid medium with NiMo catalysts: role of the metal and acid sites." Applied Catalysis B: Environmental 217, pp. 353-364. (Year: 2017).*

Shujun Yu et al., "Rational design of carbonaceous nanofiber/Ni-Al layered double hydroxide nanocomposites for high-efficiency removal of heavy metals from aqueous solutions." Environmental Pollution 242, pp. 1-11. (Year: 2018).*

Elisa Musella et al., "Electrosynthesis of Ni/Al layered double hydroxide and reduced graphene oxide composites for the development of hybrid capacitors." Electrochimica Acta 365, pp. 1-12. (Year: 2021).*

Xie, Renfeng, et al., "Facile synthesis and enhanced catalytic performance of graphene-supported Ni nanocatalyst from a layered double hydroxide-based composite precursor,", *Journal of Materials Chemistry A*, vol. 2, Issue 21, 2014 (pp. 7880-7889).

Huang, Shanhua, et al., "Reductive de-polymerization of kraft lignin with formic acid at low temperatures using inexpensive supported Ni-based catalysts", *Fuel*, 209, 2017 (pp. 579-586).

* cited by examiner

HETEROGENEOUS CATALYST, METHOD OF PRODUCING THE HETEROGENEOUS CATALYST, AND METHOD OF PRODUCING LIGNIN-DERIVED HIGH-SUBSTITUTED AROMATIC MONOMER FROM WOODY BIOMASS MATERIAL

CROSS-REFERENCE TO RELATED APPLICATION

This application claims a benefit under 35 U.S.C. § 119(a) of Korean Patent Application No. 10-2019-0037025 filed on Mar. 29, 2019, in the Korean Intellectual Property Office, the entire disclosure of which is incorporated herein by reference for all purposes.

BACKGROUND

1. Field

The present disclosure relates to a heterogeneous catalyst. More specifically, the present disclosure relates to a heterogeneous catalyst, a production method thereof, and a method of producing a lignin-derived high-substituted aromatic monomer from a woody biomass material using the catalyst, in which lignin is separated from woody biomass material, and, then, selective depolymerization of the separated lignin polymer is induced, thereby to produce the high-substituted aromatic monomer.

2. Description of Related Art

Technology of separating lignin from woody biomass material and collect cellulose therefrom has been widely used in an existing paper industry. Recently, as technology for producing biofuels and biochemical materials from cellulose has been commercialized, various lignin separation technologies have been studied.

A kraft pulping method is mainly used to separate lignin in the paper industry. In a kraft pulping process, (1) bonds between lignin, hemicellulose, and cellulose are broken using a white liquor composed of water, NaOH, and $Na_2S$, (2) a pulp containing cellulose is removed from black liquor containing hemicellulose and lignin, (3) lignin is isolated therefrom via evaporation and salt removal. However, the lignin produced in this way contains sulfur used in the pulp production process and has a condensed C—C bond which may not be depolymerized, compared with natural lignin contained in the woody biomass material. Thus, the lignin produced in the kraft pulping process has a limitation in conversion from the lignin to an aromatic high-added value fine chemical material.

In one example, a method of separating the lignin in addition to the Kraft pulping process may include a concentrated strong acid hydrolysis method, weak acid hydrolysis method, an organosolv method, steam explosion, ammonia explosion, supercritical water method, etc. However, the above methods reduce a C—O bond contained in the lignin during the lignin separation process, and form a C—C bond which disallows the depolymerization. Thus, there is a disadvantage that it is difficult to produce an aromatic monomer fine chemical material from the separated lignin.

In this connection, a process of producing biofuels and biochemical materials using the lignin separated from the woody biomass material using the above methods may involve producing aromatic monomers using supercritical water, subcritical water, supercritical alcohol, base-catalyzed depolymerization, oxidative depolymerization, heterogeneous catalyst, and hydrogen treatment using hydrogen provided externally. However, when performing depolymerization with the above process, (1) a yield of the aromatic monomer is very low due to a structural change of the lignin, (2) dissociation of C—O bonds and C—C bonds at random positions results in a lack of selectivity of aromatic compounds resulting from non-selective depolymerization. Thus, there occur disadvantages that producing an aromatic monomer fine chemical material from the separated lignin consumes a great amount of energy, and requires expensive separation/extraction/purification process.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a heterogeneous catalyst capable of selectively generating hydrogen from formic acid and inducing selective depolymerization and stabilization of lignin contained in a woody biomass material.

Another purpose of the present disclosure is to provide a method for producing the heterogeneous catalyst.

Still another purpose of the present disclosure is to provide a method for producing lignin-derived high-substituted aromatic monomers from a woody biomass material, in which a solvent containing formic acid is used to reduce a molecular weight of lignin, and lignin is extracted from a cell wall structure of the woody biomass material, and the catalyst hydrolyzes or hydrocracking the lignin at active sites on the surface thereof, and, then hydrogenation using hydrogen produced by the formic acid converts the lignin to the high-substituted aromatic monomer.

A first aspect of the present disclosure provides a heterogeneous catalyst comprising: a carrier; and a Ni—Al nanoparticle supported on the carrier.

In one implementation of the first aspect, the carrier includes activated carbon (AC).

In one implementation of the first aspect, a Ni/Al molar ratio of the Ni—Al nano-particles is in a range of 0.5 to 3.

In one implementation of the first aspect, the Ni—Al nano-particle has a core-shell structure in which an amorphous aluminum oxide or reduced aluminum phase is present around a Ni nano-particle.

In one implementation of the first aspect, a crystal size of the Ni nano-particle is in a range of 10 to 13 nm.

A second aspect of the present disclosure provides a method for producing a heterogeneous catalyst, the method comprising: introducing a carrier, a Ni precursor, and an Al precursor into ultra-pure water, thereby preparing a solution A; introducing NaOH and $Na_2CO_3$ into ultra-pure water, thereby preparing a solution B; mixing the solution A and the solution B with each other and performing centrifugation of the mixed solution, thereby to obtain a mixture of the carrier and a Ni—Al layered double oxide hydroxide (LDH); washing and drying the mixture; and firing the dried mixture.

In one implementation of the second aspect, the Ni precursor includes at least one selected from a group consisting of $Ni(NO_3)_3 \cdot 6H_2O$, $NiCl_2 \cdot xH_2O$, $Ni(CH_3$ $CO_2)_2.4H_2O$, $(NH_4)_2Ni(SO_4).6H_2O$, $NiBr_2.xH_2O$, $NiBr_2.CH_3OCH_2CH_2OCH_3$, $NiBr_2.O(CH_2CH_2OCH_3)_2$, $NiCO_3.2Ni(OH)_2.4H_2O$, $NiF_2$, $Ni(OH)_2$, $NiI_2$, $NiSO_4.xH_2O$, $K_2Ni(H_2IO_6)_2$, and $K_2Ni(CN)_4.xH_2O$, wherein the Al precursor includes at least one selected from a group consisting of $Al(NO_3)_3.9H_2O$, $AlCl_3.xH_2O$, $Al(CH_3CO_2)_3$, $AlBr_3$, $C_4H_8AlCl_3O$, $AlF_3$, $Al(OH)_3.xH_2O$, $AlI_3$, $[CH_3CH(OH)COO]_3Al$, $AlO_4P$, $Al_2(SO_4)_3.xH_2O$, and $AlNH_4(SO_4)_2.12H_2O$.

In one implementation of the second aspect, obtaining the mixture is performed at a temperature in a range of 75° C. and 85° C. for 19 hours to 21 hours.

In one implementation of the second aspect, the firing is performed for 4 to 8 hours under a flow of 4 to 7% $H_2$/Ar at a temperature of 700 to 900° C.

A third aspect of the present disclosure provides a method for producing a lignin-derived high-substituted aromatic monomer from a woody biomass material, the method comprising: introducing, into a reactor, a solution containing a heterogeneous catalyst, a woody biomass material, ethanol and formic acid, wherein the heterogeneous catalyst comprises a carrier and a Ni—Al nano-particle supported on the carrier; and increasing a temperature and a pressure inside the reactor to convert lignin of the woody biomass material to an aromatic monomer.

In one implementation of the third aspect, a Ni/Al molar ratio of the Ni—Al nano-particle is in a range of 0.5 to 3. In one implementation of the third aspect, the converting is carried out for 2 hours to 5 hours at a temperature in a range of 170° C. to 250° C. and under a pressure of 0.7 to 1.2 MPa of nitrogen.

In one implementation of the third aspect, the formic acid is introduced into the reactor at a content of 3 ml to 5 ml based on 1 g of the heterogeneous catalyst.

In one implementation of the third aspect, the aromatic monomer includes at least one selected from a group consisting of 4-n-propyl guaiacol, 4-n-propenyl guaiacol, 4-n-propanol guaiacol, 4-n-propyl syringol, 4-n-propenyl syringol, and 4-n-propanol syringol.

In one implementation of the third aspect, the method further comprises, after the conversion, collecting cellulose of the woody biomass material.

According to the present disclosure, the lignin in a liquid phase may be separated from the woody biomass material using the solution containing the heterogeneous catalyst and the formic acid, wherein the heterogeneous catalyst includes the carrier and the Ni—Al nano-particles supported on the carrier. Then, the lignin-derived high-substituted aromatic monomers may be selectively produced. At the same time, the lignin may be isolated from the woody biomass material while the cellulose may be collected.

Further, the solution containing the formic acid may be used to change the lignin of the woody biomass material to a low molecular weight state, and the lignin may be extracted from the cell wall structure of the woody biomass material. Hydrogen is selectively generated from the formic acid using the heterogeneous catalyst. The selective depolymerization and stabilization of the lignin may be induced. In this way, selectively producing the high-substituted aromatic monomers, separating the lignin from the woody biomass material, and collecting the cellulose therefrom may be achieved.

DETAILED DESCRIPTIONS

Figure 1:
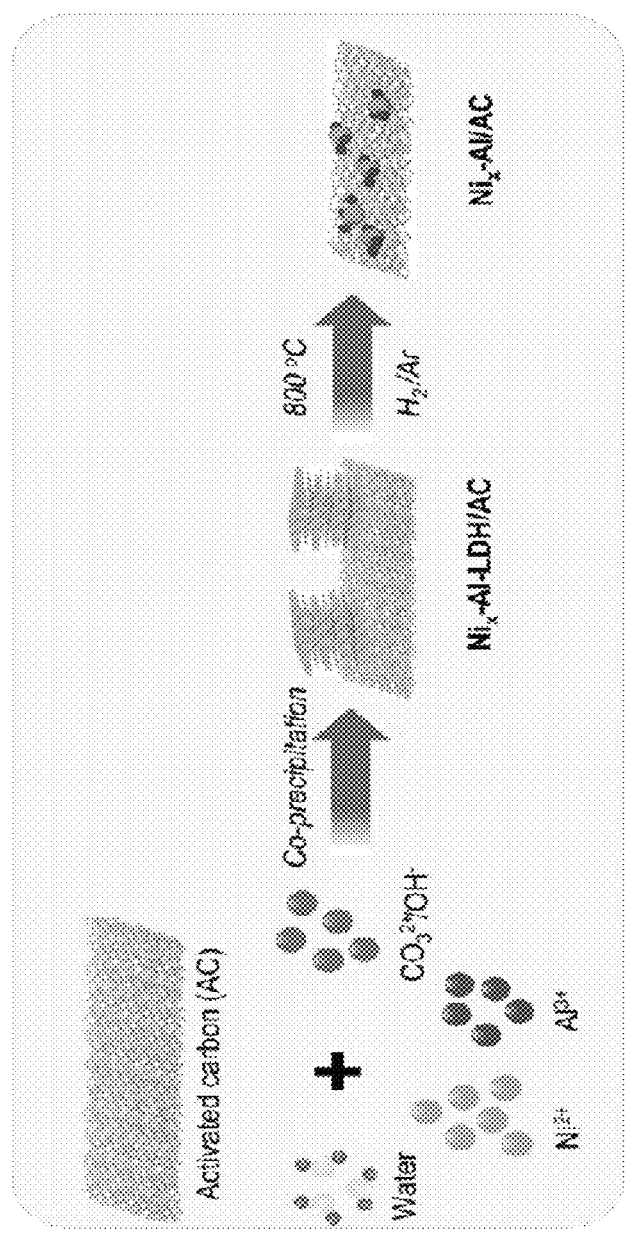
FIG. 1 schematically shows a method for producing a heterogeneous catalyst according to the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or greater other features, integers, operations, elements, components, and/or portions thereof. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A heterogeneous catalyst according to an embodiment according to the present disclosure may include a carrier, and Ni—Al nano-particles supported on a carrier and may be used as a catalyst for a reaction to selectively produce lignin-derived high-substituted aromatic monomers directly from woody biomass material (lignocellulosic biomass).

The carrier may preferably include activated carbon (AC) having a high surface area, so that the woody biomass material is easily accessible to a catalyst surface.

Further, a Ni/Al molar ratio of each of the Ni—Al nano-particles is preferably 0.5 or greater and 3 or smaller. When the Ni/Al molar ratio of the Ni—Al nano-particle is smaller than 0.5, the number of Ni nano-particles decreases, resulting in a decrease in the active surface area. When the molar ratio exceeds 3, an amorphous aluminum oxide phase or a reduced aluminum phase is not formed around the Ni nano-particle, resulting in an excessive increase of the size of the Ni nano-particle, and a large number of Ni nano-particles agglomerate, thereby reducing the active surface area.

Specifically, each of the Ni—Al nano-particles have a core-shell structure in which an amorphous aluminum oxide or reduced aluminum phase is present around a Ni nano-particle. Due to this core-shell structure, aggregation between the Ni nano-particles may be suppressed, so that the Ni nano-particle has a small crystal size of 10 to 13 nm.

Further, the Ni—Al nano-particles may be uniformly dispersed on a surface and internal pores of the carrier to increase the activity of the catalyst.

Another embodiment according of the present disclosure is directed to a method for producing the heterogeneous catalyst.

Referring to FIG. 1, a method for producing a heterogeneous catalyst according to the present disclosure includes: introducing a carrier, a Ni precursor and an Al precursor into ultra-pure water to prepare a solution A; introducing NaOH and $Na_2CO_3$ into ultra-pure water, thereby preparing a solution B; mixing the solutions A and B and performing centrifugation of the mixed solution, thereby obtaining a mixture of the carrier and a Ni—Al layered double oxide hydroxide (LDH); washing and drying the mixture; and firing the dried mixture.

First, the step of preparing the solution A by introducing the carrier, the Ni precursor, and the Al precursor into the ultra-pure water is performed.

In this connection, the Ni precursor is not particularly limited. Examples thereof may include one selected from a group consisting of $Ni(NO_3)_3.6H_2O$, $NiCl_2.xH_2O$, $Ni(CH_3CO_2)_2.4H_2O$, $(NH_4)_2Ni(SO_4).6H_2O$, $NiBr2.xH_2O$, $NiBr_2.CH_3OCH_2CH_2OCH_3$, $NiBr_2.O(CH_2CH_2OCH_3)_2$, $NiCO_3.2Ni(OH)_2.4H_2O$, $NiF_2$, $Ni(OH)_2$, $NiI_2$, $NiSO_4.xH_2O$, $K_2Ni(H_2IO_6)_2$, and $K_2Ni(CN)_4.xH_2O$.

In this connection, the Al precursor is not particularly limited. Examples thereof may include one selected from a group consisting of $Al(NO_3)_3.9H_2O$, $AlCl_3.xH_2O$, $Al(CH_3CO_2)_3$, $AlBr_3$, $C_4H_8AlCl_3O$, $AlF_3$, $Al(OH)_3.xH_2O$, $AlI_3$, $[CH_3CH(OH)COO]_3Al$, $AlO_4P$, $Al_2(SO_4)_3.xH_2O$, and $AlNH_4(SO_4)_2.12H_2O$.

Further, NaOH and $Na_2CO_3$ are introduced into the ultra-pure water, such that the solution B is prepared. In this connection, it is most preferable to use NaOH and $Na_2CO_3$ as materials for providing $OH^-$ and $CO_2^-$. However, the present disclosure is not limited thereto.

Next, the solutions A and B are mixed with each other and the mixed solution is centrifuged, thereby to obtain the mixture of the carrier and the Ni—Al layered double oxide hydroxide (LDH).

Specifically, the step of obtaining the mixture is preferably performed at 75° C. or higher and 85° C. or lower for 19 hours to 21 hours. Most preferably, the step is performed at a temperature of 80° C. for 20 hours. Under this condition, the Ni—Al layered double oxide hydroxide (LDH) (hereinafter referred to as Ni—Al LDH) is generated. The precipitated product is centrifuged using a centrifuging machine, such that the mixture of the carrier and the Ni—Al LDH may be obtained.

In this connection, the mixture still contains a large amount of unnecessary ions therein. Therefore, the step of washing and drying the mixture is performed.

Specifically, the mixture may be washed 2 to 3 times using each of distilled water and ethanol and may be then heated and dried in an oven at 75 to 82° C., thereby to obtain the Ni—Al LDH grown on the pure carrier.

Next, the step of firing the dried mixture is performed.

The firing step is most preferably carried out for 4 to 8 hours under a flow of 4 to 7% $H_2/Ar$ at a temperature condition of 700 to 900° C. During the firing step, the Ni—Al LDH structure collapses and the Ni—Al nano-particles are deposited on the surface of the carrier, thereby producing a reductive heterogeneous catalyst (See FIG. 1).

In this connection, the Ni—Al nano-particles may form amorphous aluminum oxide or reduced aluminum in the firing step. The aluminum oxide may inhibit the growth of the Ni nano-particles, such that highly dispersed Ni nano-particles on the surface of the carrier may be generated.

When using the heterogeneous catalyst according to the present disclosure, selective depolymerization and stabilization of the lignin contained in the woody biomass material may be induced, thereby selectively and directly producing the lignin-derived high-substituted aromatic monomer at a high-yield. Further, the lignin may be separated from woody biomass material and the cellulose may be collected.

Hereinafter, a method for producing the lignin-derived high-substituted aromatic monomer from the woody biomass material using the heterogeneous catalyst will be described in detail.

Figure 2:
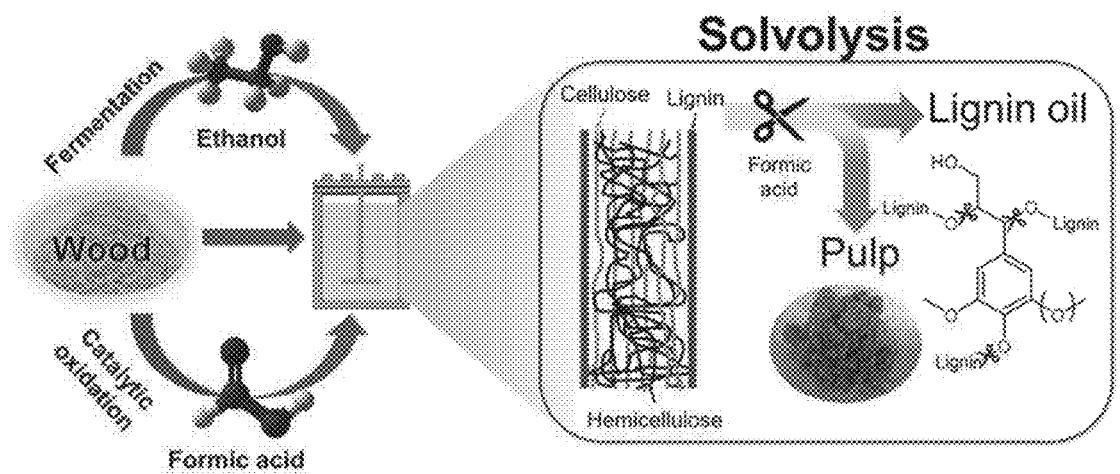
FIG. 2 schematically shows a method for producing a lignin-derived high-substituted aromatic monomer from woody biomass material according to the present disclosure.
Figure 2:
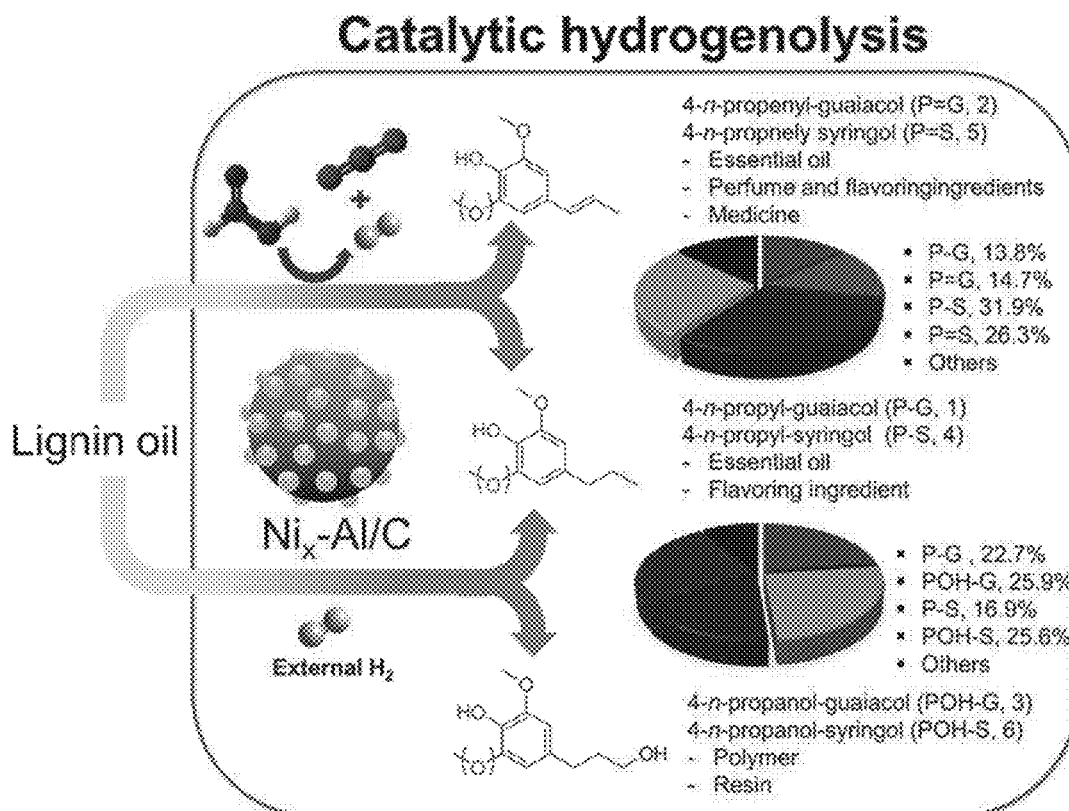

Referring to FIG. 2, a method for producing lignin-derived high-substituted aromatic monomer from woody biomass material according to the present disclosure may include introducing a solution containing a heterogeneous catalyst including a carrier and Ni—Al nano-particles supported on the carrier, a woody biomass material, ethanol and formic acid into a reactor; and increasing a temperature and a pressure inside the reactor to convert lignin of the woody biomass material to an aromatic monomer.

First, the step of introducing the solution containing the heterogeneous catalyst including the carrier and Ni—Al nano-particles supported on the carrier, the woody biomass material, ethanol, and formic acid into the reactor is performed. In this connection, the woody biomass material may employ miscanthus, pine, oak, aspen, etc. Since re-condensation of the lignin-derived aromatic monomer species may occur under a highly acidic condition, it is desirable to introduce the formic acid in an amount of 3 ml or greater and 5 ml or smaller based on 1 g of the heterogeneous catalyst.

Thereafter, the step of converting the lignin of the woody biomass material to an aromatic monomer is performed by raising the temperature and pressure inside the reactor.

The conversion step may be performed for 2 hours or greater and 5 hours or smaller under the condition of raising the temperature inside the reactor to 170° C. or higher and 250° C. or lower under a pressure of 0.7 to 1.2 MPa of nitrogen. When the temperature inside the reactor is lower than 170° C., the conversion reaction of the woody biomass material into the aromatic monomer may not occur. When the reaction temperature exceeds 250° C., a gasification reaction of the woody biomass material actively occurs, thereby to cause a problem that the yield of the aromatic monomer is lowered.

Therefore, in the above step, it is most preferable to perform the conversion reaction for 3 hours by heating the reaction temperature of the reactor to 190° C. in a state in which the reactor is purged with nitrogen and then the reactor is pressurized using 1 MPa of nitrogen.

According to the present disclosure, when using the solution containing ethanol and formic acid, the lignin of the woody biomass material may be changed to a low molecular weight state and the lignin may be extracted from the cell wall structure of the woody biomass material. In this connection, the formic acid may selectively produce hydrogen.

Further, the heterogeneous catalyst according to the present disclosure selectively generates hydrogen from formic acid, and selectively depolymerizes the lignin isolated from woody biomass material and induces stabilization thereof, thereby to selectively produce high-substituted aromatic monomers. The heterogeneous catalyst according to the present disclosure hydrolyzes or hydrocracks the lignin at active sites on the surface thereof. Then, hydrogenation using hydrogen produced by the formic acid may convert the lignin to the high-substituted aromatic monomer.

In the conversion step, a yield of the aromatic monomer is calculated as follows.

Aromatic monomer yield (wt %) =
$$\frac{\text{selectivity}(\%) \text{ of aromatic monomer} \times \text{lignin oil amount}}{\text{lignin amount}}$$

Figure 3:
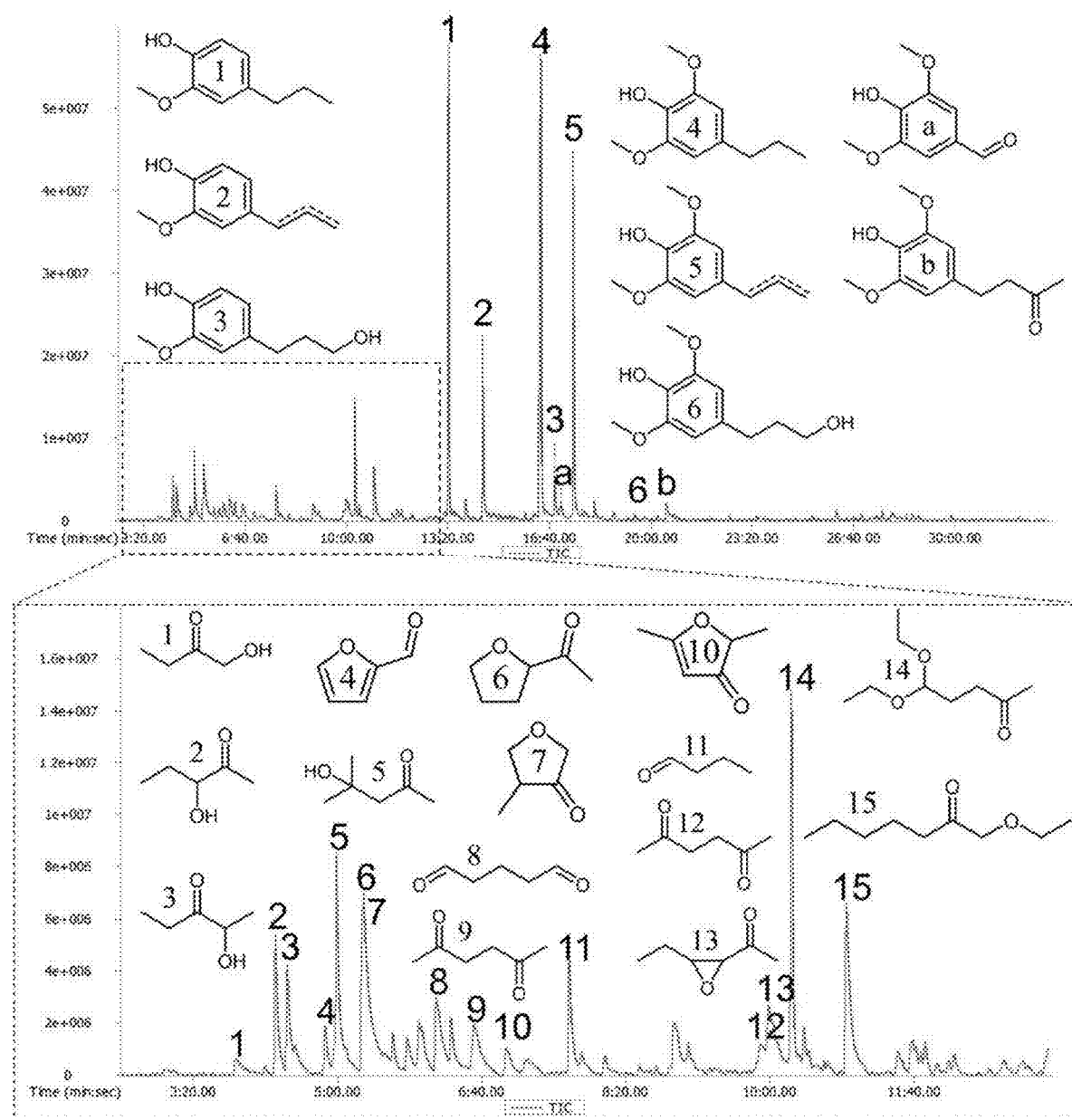
FIG. 3 is a view showing results of analyzing DSO generated according to an embodiment of the present disclosure, using GC/TOF-MS.

The aromatic monomer compound produced according to the above production method may include at least one selected from 4-n-propyl guaiacol, 4-n-propenyl guaiacol, 4-n-propanol guaiacol, 4-n-propyl syringol, 4-n-propenyl syringol, and 4-n-propanol syringol, as shown in FIG. 3

4-n-propyl guaiacol (or Dihydroeugenol) is a compound that may be directly used in the perfume industry, food and beverage bio fragrance, and cosmetics industry and may also be used as a synthetic raw material for eugenol. 4-n-propenyl guaiacol (or Eugenol) is a substance that may be directly used in the perfume industry, food and beverage bio fragrance, cosmetic industry (UV blocker), medical bio active material industry (fungicide, analgesic, biocide, etc.) and rubber and plastic industry (antioxidant). Isoeugenol is a substance that may be used directly in the perfume industry, food and beverage bio-scents industry, and medical bio-chemicals industry.

Further, 4-n-propyl syringol is a very expensive substance used in the food and beverage bio fragrance and perfume industry. 4-n-propenyl syringol may be directly used in perfume industry and perfume industry, and may be used as a precursor for anticancer and antioxidant synthesis.

In one example, after the conversion step, the step of collecting cellulose of woody biomass material may be further performed.

In detail, liquid and solid products as produced in the conversion are separated using a filter paper. The solid product may be washed with each of ethanol, water and acetone, thereby removing soluble organic substances adsorbed on the solid surface, and may be then dried in a drying oven at 70° C. to 85° C. overnight to collect a pulp solid.

Further, the liquid product was subjected to an evaporation process at 45° C. to 55° C. and at 0.02 MPa for 1 hour to remove acetone and ethanol therefrom. A DCM solution is used in a separatory funnel, such that a residual liquid is separated in a liquid-liquid separation manner. Then, an extract is washed three times with DCM such that DCM-soluble organic (DSO) material may be collected. The collected DCM-soluble product is desirably dried to remove residual solvent therefrom.

Further, a water-soluble organic matter in a top of the separatory funnel is collected and dried to collect DCM soluble organic (DSO) material, water-soluble organic (WSO) material, and the pulp solid.

The yields of the DCM soluble organic (DSO), water soluble organic (WSO) and pulp solids are calculated using following equations.

$$\text{Yield of } DSO \text{ (wt \%)} = \frac{\text{Weight of dried } DSO}{\text{Weight of dryash} - \text{free feedstock}} \times 100\%$$

$$\text{Yield of } WSO \text{ (wt \%)} = \frac{\text{Weight of dried } WSO}{\text{Weight of dryash} - \text{free feedstock}} \times 100\%$$

Yield of pulp − rich solid (wt %) =
$$\frac{\text{Weight of } solidresidue - \text{Weight of catalyst}}{\text{Weight of dryash} - \text{free feedstock}} \times 100\%$$

Thus, according to the present disclosure, lignin may be isolated from woody biomass material. Further, the lignin-derived high-substituted aromatic monomers may be selectively produced at a high-yield. Further, while the lignin is isolated from woody biomass material, the cellulose may be collected.

Hereinafter, various Present Examples and Experimental Examples according to the present disclosure will be described. However, the Present Examples below are only some examples according to the present disclosure. Thus, the present disclosure should not be interpreted as being limited to the following present examples.

Synthesis of Heterogeneous Catalyst

Heterogeneous catalyst was produced according to following Present Examples and Comparative Examples. Table 1 shows Present Examples and Comparative Examples briefly.

Present Example 1 to Present Example 4

Activated carbon (AC) 1.12 g, Ni(NO$_3$)$_3$.6H$_2$O and Al(NO$_3$)$_3$.9H$_2$O was introduced into 150 ml of ultra-pure water at a Ni/Al molar ratio of 0.5:1, 1:1, 2:1, and 3:1 respectively, thereby to prepare solutions A.

Further, NaOH and $Na_2CO_3$ were introduced in 150 ml of ultra-pure water at a molar concentration according to following equations, and thus a solution B was prepared.

Equations:
$$[OH^-]=1.8[Ni^{2+}+Al^{3+}], [CO^{2-}]=2[Al^{3+}]$$

Subsequently, the prepared solution B was gradually added to each solution A and each solution A and the solution B were thoroughly mixed with each other. After aging the mixture at 80° C. for 20 hours, a mixture (hereinafter referred to as Ni—Al LDH/AC) of a carrier and a Ni—Al layered double oxide hydroxide was produced. The precipitated Ni—Al LDH/AC was collected using a centrifuging machine and was washed 3 times with ultra-pure water and 2 times with ethanol, and then, was dried overnight in an oven at 80° C., thereby to obtain a Ni—Al LDH grown on a pure carrier (activated carbon).

Finally, the dried Ni—Al LDH/AC was fired at 800° C. for 6 hours at a heating rate of 2.2° C./min under a flow of 5% $H_2$/Ar at a flow rate of 100 ml/min, thereby synthesizing a reductive heterogeneous catalyst.

In this connection, Ni weights in Present Examples 1 to 4 were adjusted to 25.5 wt %, 39.5 wt %, 54.1 wt %, and 64.9 wt %, respectively, based on ICP-OES (inductively coupled plasma atomic emission spectroscopy) measurement.

Comparative Example 1

5 wt % Pd/C catalyst as produced by Sigma-Aldrich (USA) was prepared as Comparative Example 1.

Comparative Example 2 and Comparative Example 3

An ethanol solution incorporating $Ni(NO_3)_3 \cdot 6H_2O$ therein was used, thereby obtaining 30 wt % Ni/AC catalyst and 30 wt % Ni/AC+γ-$Al_2O_3$ catalyst via a known initial wet impregnation method.

Then, the ethanol solution was stirred for 1 hour, and then dried at 80° C. to remove the solvent. A residue was fired at 800° C. for 6 hours at a heating rate of 2.2° C./min under a flow of 5% $H_2$/Ar at a flow rate of 100 ml/min, thereby synthesizing 30 wt % Ni/AC catalyst and 30 wt % Ni/AC+ γ-Al2O3 catalyst.

Comparative Example 4

Raney Ni catalyst produced by TCI (Japan) was prepared as Comparative Example 4.

TABLE 1

| catalyst | | Ni:Al molar ratio |
|---|---|---|
| Present Example 1 | $Ni_{0.5}$—Al/AC catalyst | 0.5:1 |
| Present Example 2 | $Ni_1$—Al/AC catalyst | 1:1 |
| Present Example 3 | $Ni_2$—Al/AC catalyst | 2:1 |
| Present Example 4 | $Ni_3$—Al/AC catalyst | 3:1 |
| Comparative Example 1 | 5 wt % Pd/C catalyst | — |
| Comparative Example 2 | 30 wt % Ni/AC catalyst | — |
| Comparative Example 3 | 30 wt % Ni/AC + γ-$Al_2O_3$ catalyst | — |
| Comparative Example 4 | Raney Ni catalyst | — |

Experimental Example 1

Figure 4A:
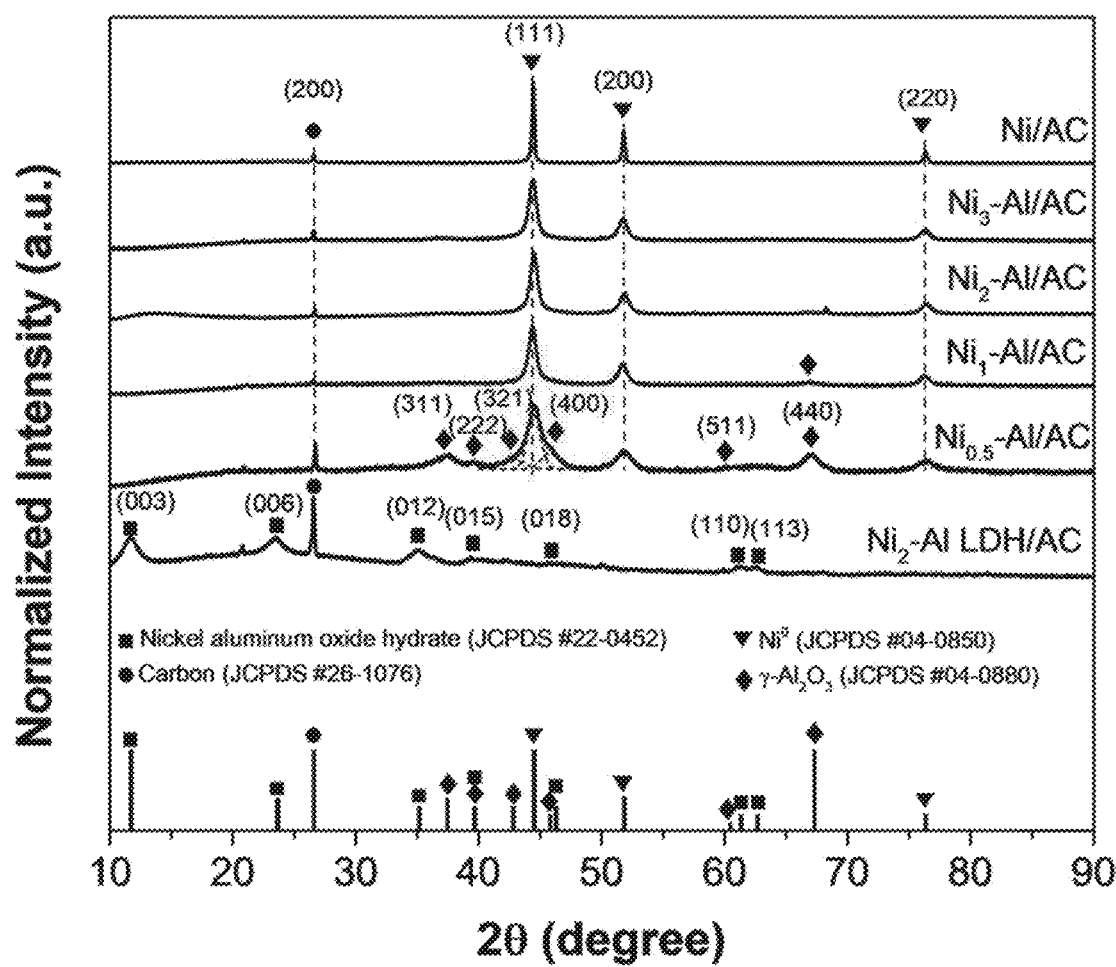
FIG. 4A is a diagram showing XRD pattern results of catalysts according to an embodiment of the present disclosure.
Figure 4B:
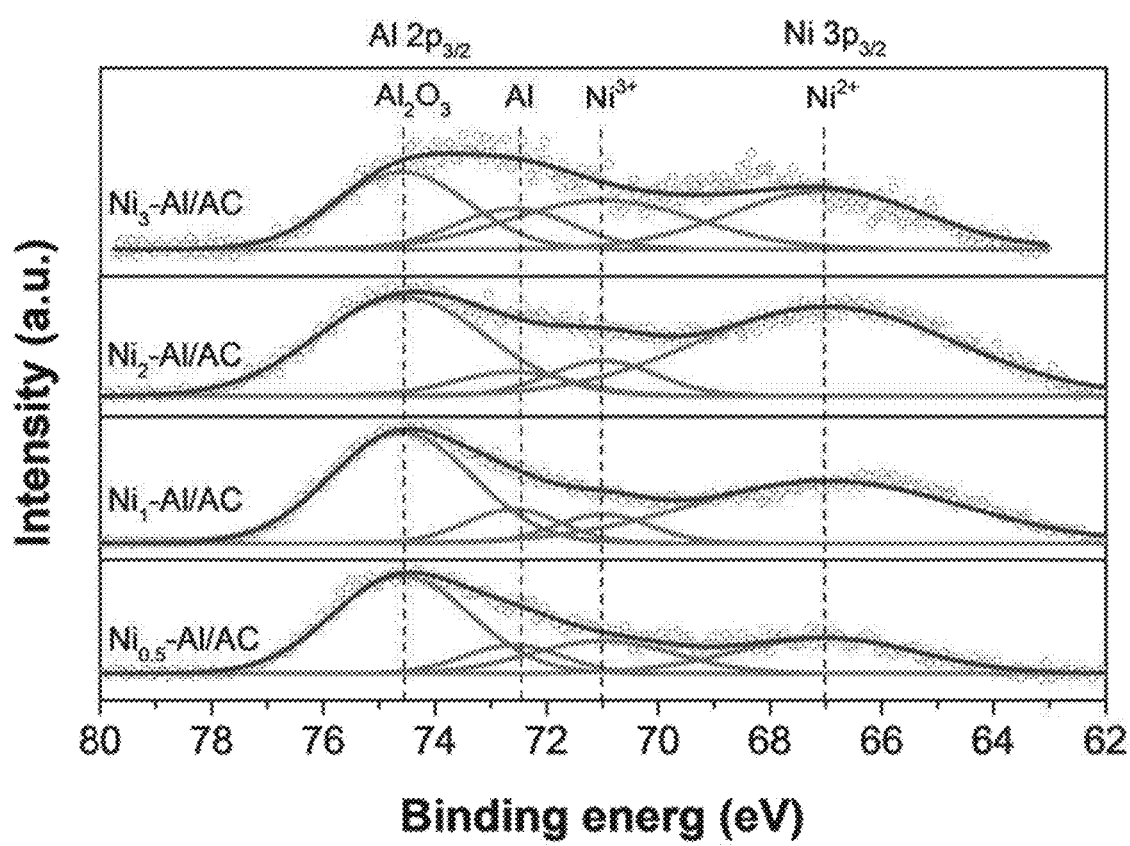
FIG. 4B and FIG. 4C are diagrams showing XPS spectrum results of catalysts according to an embodiment of the present disclosure.
Figure 4C:
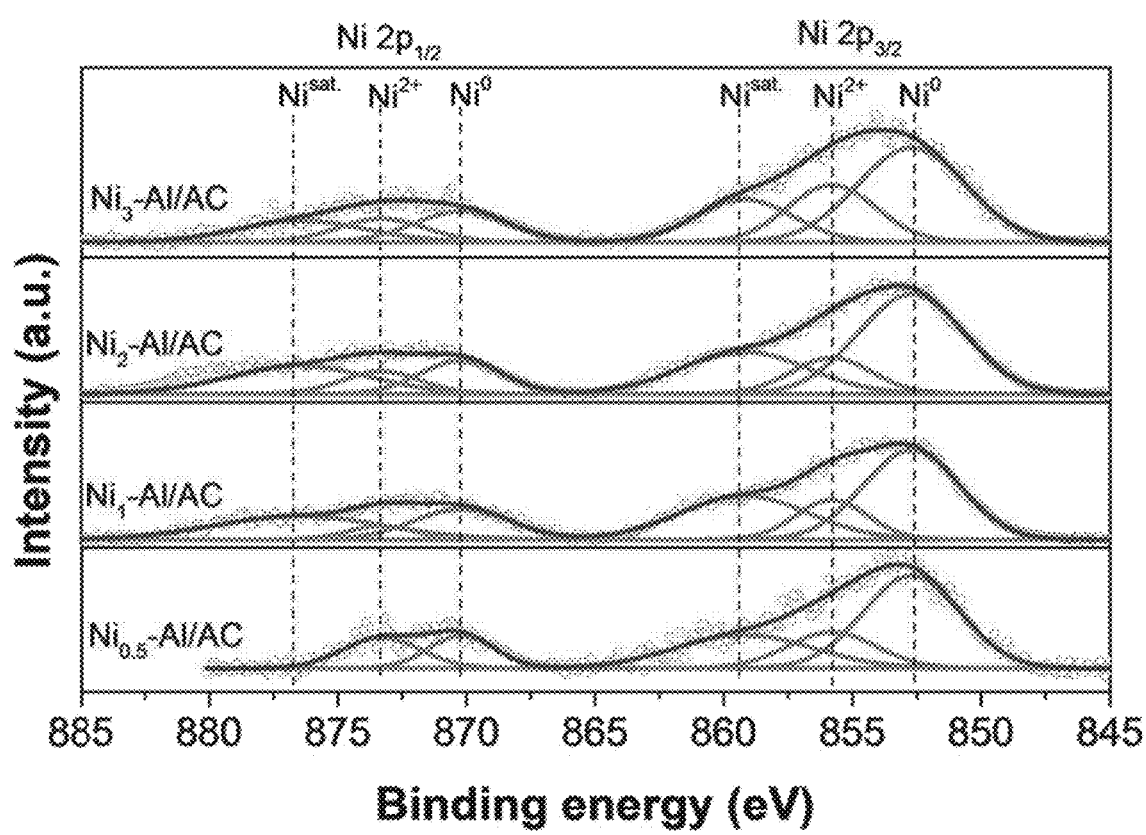

To check properties of the heterogeneous catalyst based on the molar ratio of Ni/Al, XRD pattern results via X-ray diffraction analysis (XRD) about a mixture before firing of Present Example 3, Present Example 1 to Present Example 4, and Comparative Example 2 are shown in FIG. 4A. XPS spectrum results via X-ray photoelectron spectroscopy about a mixture before firing of Present Example 3, Present Example 1 to Present Example 4, and Comparative Example 2 are shown in FIGS. 4B-4C.

Further, TEM images as taken using Tecnai-$G^2$ high-resolution transmission electron microscope from FEI corporation and $N_2$ adsorption-desorption isotherm graphs about Present Example 1 to 4 are shown in FIGS. 5A-5D.

Table 2 shows characteristics of Present Example 1 to Present Example 4 and Comparative Example 2, based on ICP-OES, XRD pattern, and TEM image.

TABLE 2

| | Ni/Al molar ratio | Theoretical weight ratio [wt %] | | Experimental weight ratio [wt %] | | Ni crystal size [nm] | $D_{TEM}$ [nm] | $S_{BET}$ [$m^2g^{-1}$] | $V_{pore}$ [$cm^3g^{-1}$] |
|---|---|---|---|---|---|---|---|---|---|
| | | Ni | Al | Ni | Al | | | | |
| Present Example 1 | 0.5 | 25.6 | 23.5 | 25.5 | 22.5 | 10.3 | 13.7 | 318 | 0.4264 |
| Present Example 2 | 1 | 33.6 | 15.4 | 39.5 | 16.6 | 12.3 | 13.3 | 295 | 0.5724 |
| Present Example 3 | 2 | 40.0 | 9.17 | 54.1 | 11.6 | 13.0 | 15.3 | 312 | 0.4998 |
| Present Example 4 | 3 | 42.5 | 6.55 | 64.9 | 9.57 | 12.3 | 15.2 | 317 | 0.4562 |
| Comparative Example 2 | — | 30.0 | 0 | 35.3 | 0 | 37.8 | | 445 | 0.3429 |

Referring to FIG. 4A, it was confirmed that the mixture before firing of Present Example 3 showed a peak related to a Ni—Al LDH phase. This indicates that high-purity Ni—Al LDH was formed on the surface of activated carbon via co-precipitation.

Specifically, a $Ni_2$—Al LDH crystal size of the mixture before firing of Present Example 3 estimated using a (003) plane and a Scherrer equation was estimated to be 4.8 nm. A sharp peak thereof at 26.6° corresponds to a interlayer spacing of a graphite layer in the activated carbon.

In one example, in Present Examples 1 to 4, (111), (200) and (220) planes associated with a metal Ni fcc plane were observed at 44.5°, 51.8° and 76.4°, respectively. It was confirmed that a peak associated with the Ni—Al LDH phase disappeared.

In Present Example 1 in which Al is rich, a (311) plane was wide, and (222), (321), (400), (511), and (440) peaks related to γ-$Al_2O_3$ were observed at 39.7°, 42.8°, 45.8°, 60.5°, and 67.3° respectively. This indicates that the metal Ni and γ-$Al_2O_3$ phases were formed on the surface of the activated carbon while the Ni—Al LDH phase has collapsed during the firing process.

On the other hand, in Present Examples 2 to 4 with the Ni/Al molar ratio of 1 or greater, a peak associated with γ-$Al_2O_3$ was absent. An Al content ranged from 9.57 to 16.6 wt %, which was much larger than a detection limit of XRD.

This means that amorphous aluminum oxide or reduced aluminum species (e.g., AlOH, $Al^O$) may be present in Present Examples 2 to 4.

Further, referring to Table 2, the Ni crystal size of each of Present Examples 2 to 4 was in a range of 10 nm to 13 nm as a calculation result based on the (111) plane and the Scherrer equation. The nickel crystal size of Comparative Example 2 was measured to be 37.8 nm. Thus, the Ni crystal size of each of Present Examples 2 to 4 had a much smaller value than that of Comparative Example 1.

This indicates that the presence of amorphous aluminum oxide or reduced aluminum species adjacent to the metal Ni nano-particles may inhibit aggregation between Ni nano-particles during the firing process.

Referring to FIG. 4B, the deconvolved peaks are located at 74.6 eV and 72.6 eV, respectively, resulting from the Al—O bond and $Al^O$, thereby indicating the presence of aluminum oxide and reduced aluminum species. The presence of $Al^O$ in the XPS spectrum does not appear in the XRD pattern in FIG. 4A. This may be due to the formation of a thin $Al^O$ layer beneath the surface of the amorphous aluminum oxide resulting from thermal carbon reduction.

Two peaks of Ni $3p_{3/2}$ in FIG. 4B are related to $Ni^{2+}$ and $Ni^{3+}$ at 67.0 eV and 71.0 eV, respectively.

As shown in FIG. 4C, Ni $2p_{1/2}$ and Ni 2p3/2, XPS spectra are deconvolved into $Ni^{2+}$ (873.3 eV and 855.8 eV, respectively), $Ni^0$ (870.2 eV and 852.7 eV, respectively), and $Ni^{sat}$ (876.5 eV and 860.8 eV, respectively). The presence of $Ni^{2+}$ suggests surface oxidation of the Ni nano-particle upon exposure thereof to air.

In one example, referring to FIGS. 5A-5D, it may be seen that the Ni nano-particle of each of Present Examples 1 to 4 has a size in a range of 7 to 25 nm. As the Ni/Al molar ratio increased, the average particle size increased from 13 nm to 15 nm by a small value.

Specifically, referring to a high magnification TEM image, it was confirmed that the surface of the Ni nano-particle of each of Present Examples 1 to 4 was covered with amorphous alumina oxide. In particular, in Present Example 1 in which Al is rich, a (400) plane of γ-$Al_2O_3$ having a lattice space of 0.193 nm was observed.

Figure 5A:
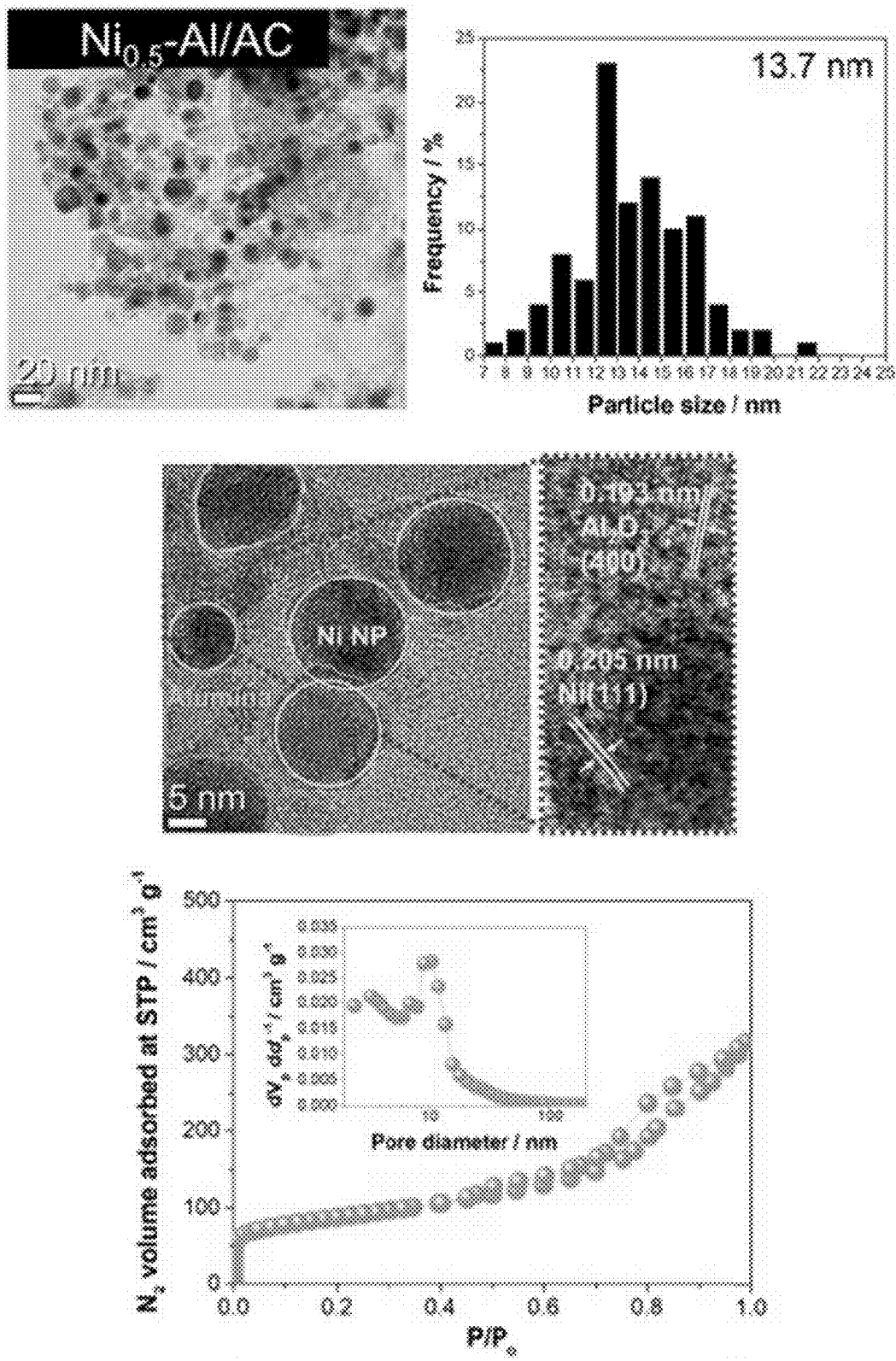
FIGS. 5A-5D is a diagram showing a TEM image and a $N_2$ adsorption-desorption isotherm graph of catalysts according to an embodiment of the present disclosure.
Figure 5B:
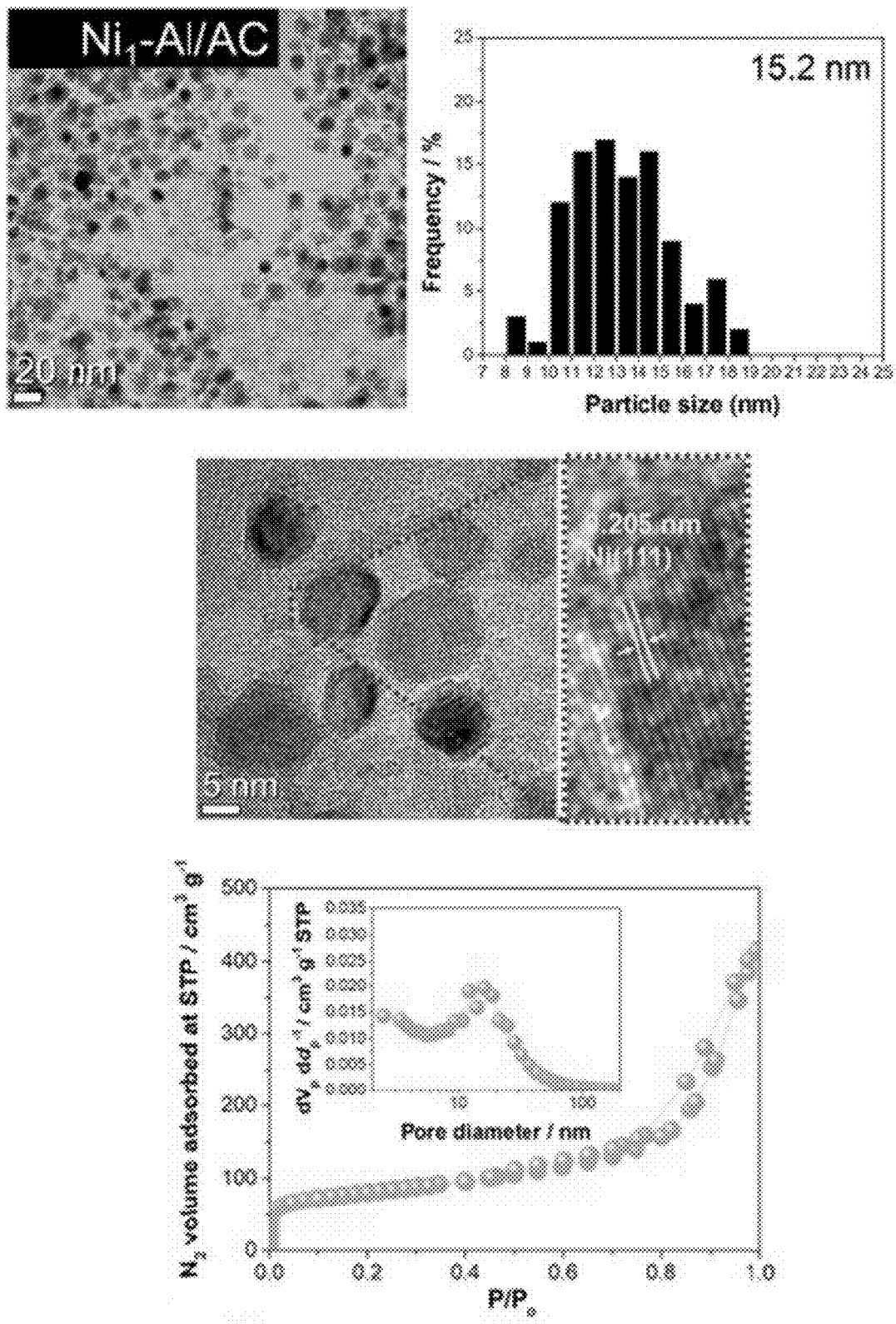
Figure 5C:
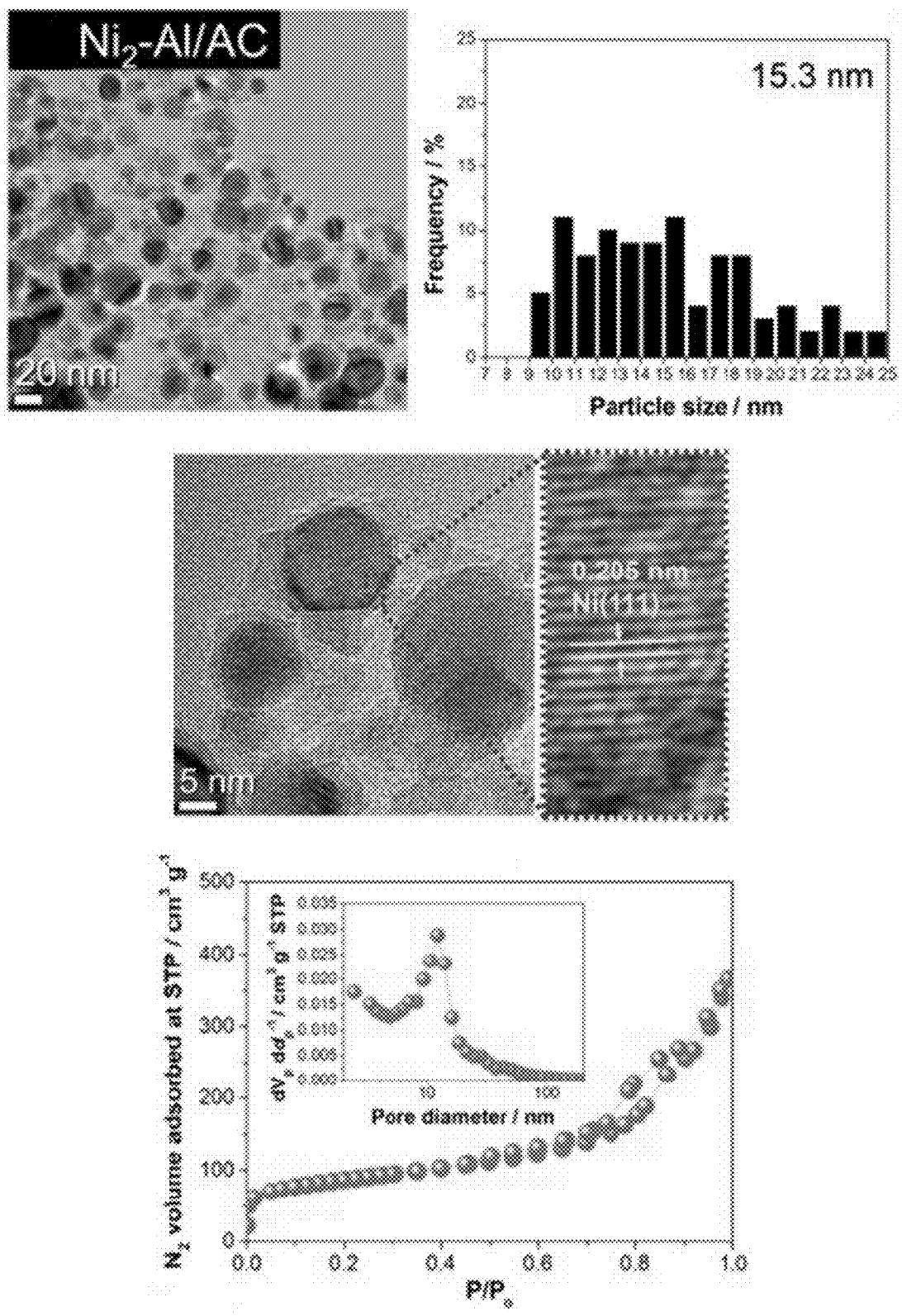
Figure 5D:
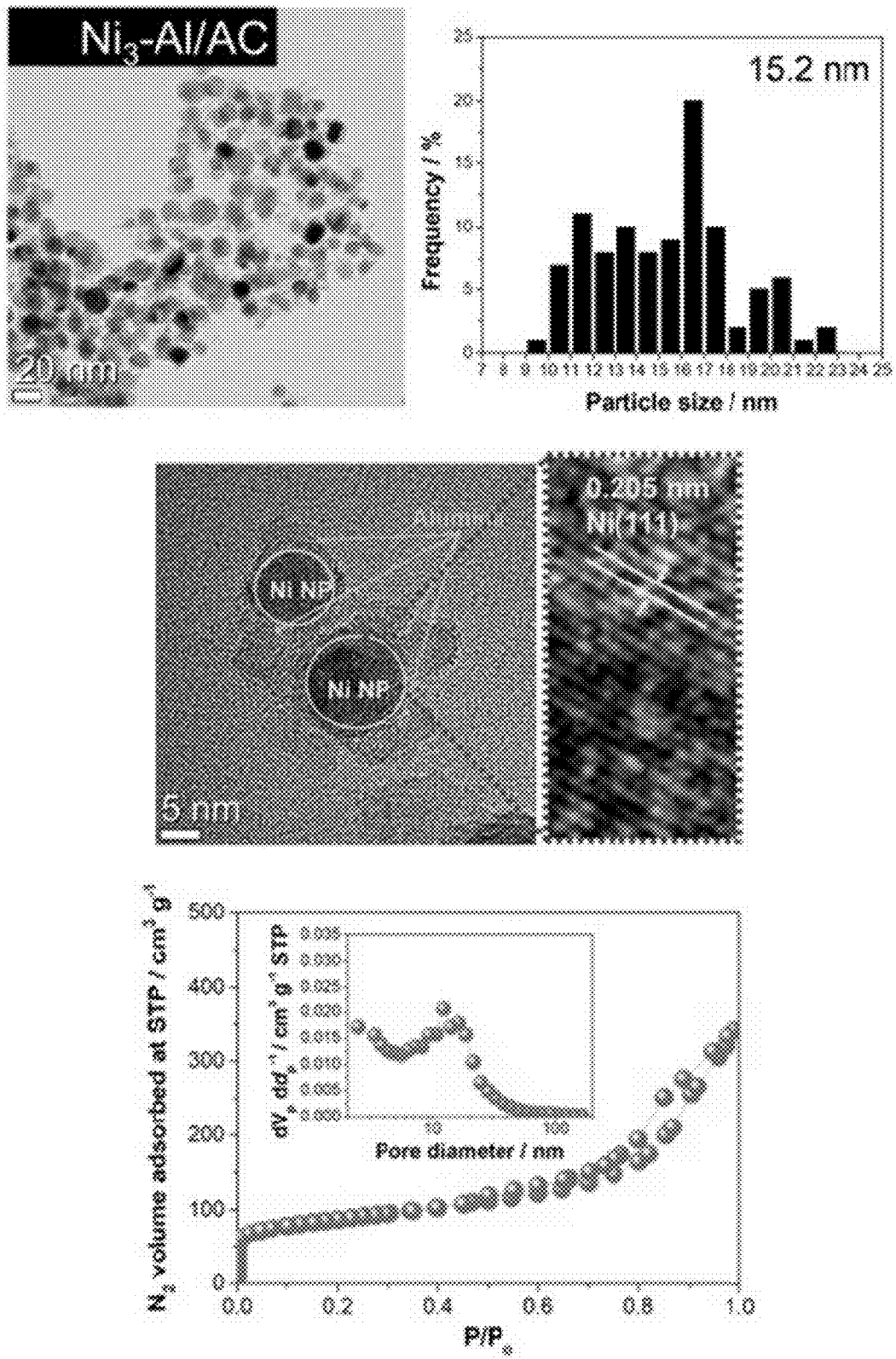

A crystal phase of γ-$Al_2O_3$ was not observed as the Al content decreased. In Present Examples 2 to 4, an amorphous aluminum oxide layer coating the surface of the Ni nano-particle was observed (FIGS. 5B-5D). That is, in Present Examples 2 to 4, formation of a unique core-shell structure prevents the crystal size of the Ni nano-particle from increasing.

In one example, referring to the $N_2$ adsorption-desorption isotherm graph in FIGS. 5A-5D, a Type IV form occurs based on a hint in a H3 hysteresis loop. Thus, it may be identified that the catalyst of Present Example has a slit-type medium-sized pore.

A pore diameter measured using a Barrett-Joyner-Halenda (BJH) method was in a range of 5 to 40 nm (see Table 2). A BET surface area did not change significantly (about 300 $m^2\ g^{-1}$) even when the Ni/Al molar ratio increased.

Experimental Example 2

Figure 6:
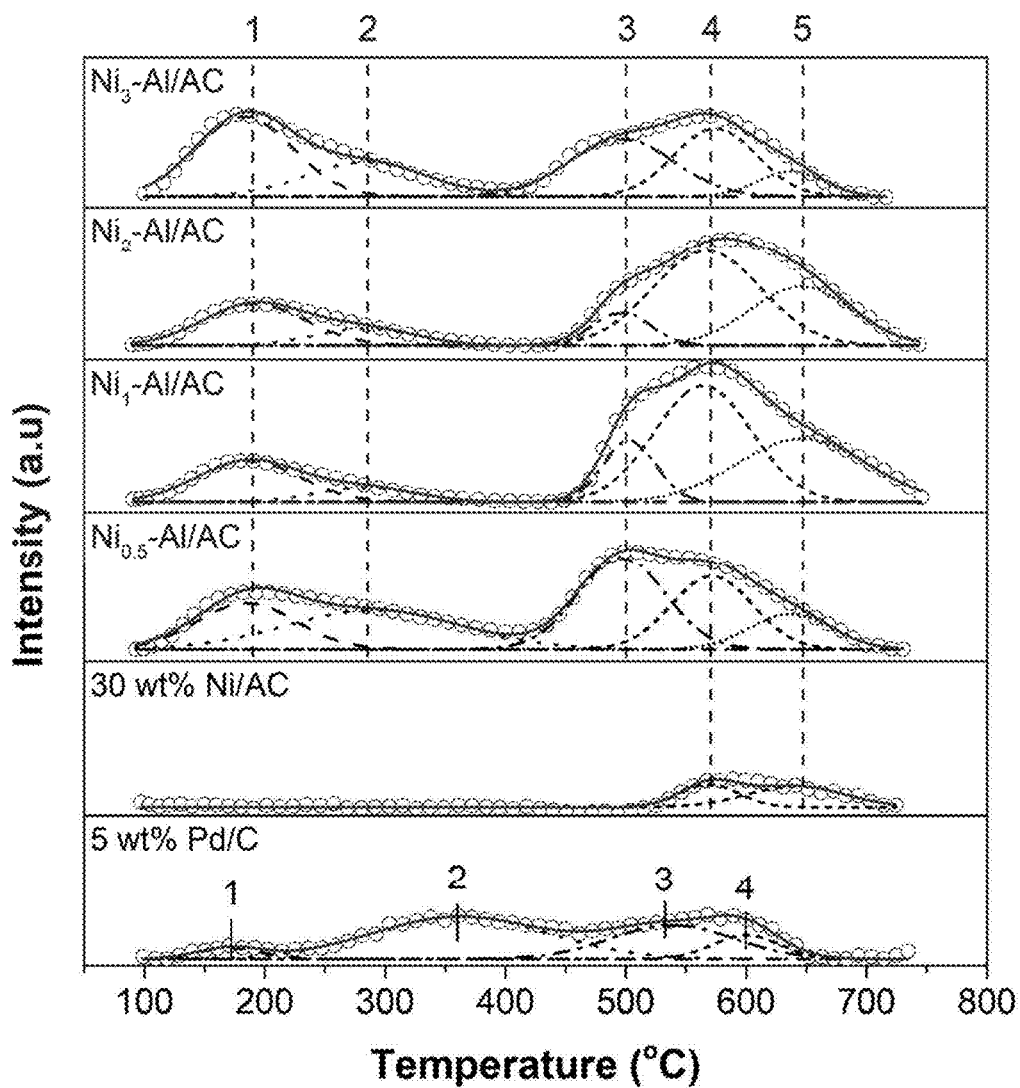
FIG. 6 is a view showing results of measuring a $H_2$-TPD profile of catalysts according to an embodiment of the present disclosure.

A H2-TPD profile (activated carbon being excluded) of each of Present Examples 1 to 4 and Comparative Examples 1 and 2 was measured, and the results are shown in Table 3 and FIG. 6.

TABLE 3

| | $H_2$ desorption [mmolg$^{-1}$] based on catalyst weight | | | | | | | |
|---|---|---|---|---|---|---|---|---|
| Catalyst catalyst | Peak 1 | Peak 2 | Peak 3 | Peak 4 | Peak 5 | Total | Peak 1 + 2 (low temperature desorption region) | Peak 3 + 4 + 5 (high temperature desorption region) |
| Present Example1 | 0.046 | 0.069 | 0.081 | 0.060 | 0.029 | 0.285 | 0.115 | 0.170 |
| Present Example2 | 0.043 | 0.015 | 0.033 | 0.114 | 0.083 | 0.288 | 0.058 | 0.230 |
| Present Example3 | 0.043 | 0.017 | 0.019 | 0.104 | 0.061 | 0.244 | 0.060 | 0.184 |
| Present Example4 | 0.078 | 0.042 | 0.061 | 0.057 | 0.016 | 0.255 | 0.120 | 0.134 |
| Comparative Example2 | 0 | 0 | 0 | 0.006 | 0.010 | 0.016 | 0 | 0.016 |
| Comparative Example1 | 0.003 | 0.035 | 0.020 | 0.008 | 0 | 0.066 | 0.038 | 0.028 |

As shown in FIG. 6, in Present Examples 1 to 4, the profile is composed of a low temperature desorption region below 400° C. and a high temperature desorption region above 400° C. Thus, different types of hydrogens are adsorbed and present on a surface of the catalyst of each of Present Example 1 to Present Example 4, together with the Ni nano-particles of different interaction strengths.

A low temperature TPD region may be attributed to hydrogen desorption. A high temperature TPD region may be associated with escape or spillover of hydrogen species as strongly bonded under the surface of the catalyst. The low and high desorption peaks are deconvolved into 2 and 3 peaks, respectively, in FIG. 6. This indicates that, in each of Present Examples 1 to 4, at least five different hydrogen desorption mechanisms may exist depending on a strength of interaction with the heterogeneous catalyst surface.

Referring to Table 3, an amount of spillover hydrogen at 400° C. or higher was as follows: Present Example 2 0.230 mmol/g>Present Example 3 0.184 mmol/g>Present Example 1 0.170 mmol/g>Present Example 4 0.134 mmol/g.

On the other hand, in Comparative Example 2, no desorption peak was observed at low temperatures below 400° C. An amount of desorbed hydrogen above 400° C. was 0.016 mmol/g, which was very small. This is believed to be due to a large size of the Ni nano-particle and the absence of $Al_2O_3$. An ability of the Ni-based catalyst to improve the hydrogen spillover is an important factor in determining the stabilization of the lignin-derived aromatic monomer.

Further, referring to FIG. 6, the $H_2$-TPD profiles of Comparative Example 1 showed four broad peaks at 170.3° C., 362.1° C., 538.5° C. and 600.0° C., respectively. An amount of desorbed hydrogen in the high temperature region was 0.028 mmol/g, which was smaller than those of Present Examples. This is believed to be due to a difference between metal weights thereof. That is, a metal weight of each of Present Examples is in a range of 25.5 to 64.9 wt %, while a metal weight of Comparative Example 1 is only 5 wt %.

Conversion Reaction from Lignin of Woody Biomass Material to Aromatic Monomer

The conversion reaction was performed according to following Present Examples and Comparative Examples.

Present Example 1-1

1 g of $Ni_1$—Al/AC catalyst of Present Example 2, 5 g of oak tree, and 40 ml of a mixture of 23 ml of ethanol, 12 ml of distilled water, and 5 ml formic acid were introduced into a 140 ml volume batch-type reactor. After purging the reactor with nitrogen, a reaction temperature was heated to 190° C. while pressurizing the reactor with 1 MPa of nitrogen, such that a conversion reaction was performed for 3 hours.

Comparative Example 1-1

0.45 g of 5 wt % Pd/C catalyst of Comparative Example 1, 3 g of oak tree, and 60 ml of methanol were introduced into a 140 ml volume batch-type reactor. After purging the reactor with hydrogen, a reaction temperature was heated to 250° C. while pressurizing the reactor with 3 MPa of hydrogen, such that a conversion reaction was performed for 3 hours.

Comparative Example 1-2

0.45 g of $Ni_1$—Al/AC catalyst of Present Example 2, 3 g of oak tree, and 60 ml of methanol were introduced into a 140 ml volume batch-type reactor. After purging the reactor with hydrogen, a reaction temperature was heated to 250° C. while pressurizing the reactor with 3 MPa of hydrogen, such that a conversion reaction was performed for 3 hours.

Comparative Example 1-3

1 ml of 5 wt % Pd/C catalyst of Comparative Example 1, 5 g of oak tree, and 40 ml of a mixture of 23 ml of ethanol, 12 ml of distilled water, and 5 ml formic acid were introduced into a 140 ml volume batch-type reactor. After purging the reactor with nitrogen, a reaction temperature was heated to 190° C. while pressurizing the reactor with 1 MPa of nitrogen, such that a conversion reaction was performed for 3 hours.

Comparative Example 1-4

Only 5 g of oak tree, and 40 ml of a mixture of 23 ml of ethanol, 12 ml of distilled water, and 5 ml formic acid were introduced into a 140 ml volume batch-type reactor without adding the catalyst thereto. After purging the reactor with nitrogen, a reaction temperature was heated to 190° C. while pressurizing the reactor with 1 MPa of nitrogen, such that a conversion reaction was performed for 3 hours.

Comparative Example 1-5

1 ml of 30 wt % Ni/AC catalyst of Comparative Example 2, 5 g of oak tree, and 40 ml of a mixture of 23 ml of ethanol, 12 ml of distilled water, and 5 ml formic acid were introduced into a 140 ml volume batch-type reactor without adding the catalyst thereto. After purging the reactor with nitrogen, a reaction temperature was heated to 190° C. while pressurizing the reactor with 1 MPa of nitrogen, such that a conversion reaction was performed for 3 hours.

Comparative Example 1-6

1 ml of 30 wt % Ni+γ-$Al_2O_3$ catalyst of Comparative Example 3, oak tree 5 g, and 40 ml of a mixture of 23 ml of ethanol, 12 ml of distilled water, and 5 ml formic acid were introduced into a 140 ml volume batch-type reactor without adding the catalyst thereto. After purging the reactor with nitrogen, a reaction temperature was heated to 190° C. while pressurizing the reactor with 1 MPa of nitrogen, such that a conversion reaction was performed for 3 hours.

Comparative Example 1-7

2.8 g of Raney Ni catalyst of Comparative Example 4, 5 g of oak tree, and 40 ml of a mixture of 23 ml of ethanol, 12 ml of distilled water, and 5 ml formic acid were introduced into a 140 ml volume batch-type reactor without adding the catalyst thereto. After purging the reactor with nitrogen, a reaction temperature was heated to 190° C. while pressurizing the reactor with 1 MPa of nitrogen, such that a conversion reaction was performed for 3 hours.

Comparative Example 1-8

1 ml of Ni1—Al/AC catalyst of Present Example 2, 5 g of oak tree, and 40 ml of a mixture of 23 ml of ethanol, 12 ml of distilled water, and 5 ml formic acid were introduced into a 140 ml volume batch-type reactor without adding the catalyst thereto. After purging the reactor with nitrogen, a reaction temperature was heated to 190° C. while pressurizing the reactor with 1 MPa of nitrogen, such that a conversion reaction was performed for 3 hours.

Subsequently, liquid and solid products generated in the Present Examples and Comparative Examples were separated using a GF/B Whatman filter paper. The solid product was washed with 100 ml of each of ethanol, water, and acetone, thereby removing a soluble organic substance adsorbed on the solid surface, and then was dried at 80° C. in a drying oven overnight, thereby to collect a pulp solid.

Further, the liquid product was subjected to an evaporation process at 50° C. and 0.02 MPa for 1 hour to remove acetone, methanol or ethanol therefrom. 100 ml of DCM solution was used in a separating funnel, such that a residual liquid product was separated in a liquid-liquid separation manner, and then an extract was washed 3 times with DCM solution, thereby to collect DCM-soluble organic (DSO) material. The collected DCM-soluble organic material was subjected to an evaporation process at 50° C., and 0.04 MPa for 0.5 hour, and then further dried in a vacuum drying oven at 50° C., thereby to remove residual solvent therefrom.

After collecting a water-soluble organic material in a top of the separating funnel, the water-soluble organic material was subjected to an evaporation process at 80° C. and 0.02 MPa for 1 hour, and was dried in a drying oven at 80° C., thereby to collect a water-soluble organic material (WSO).

A product yield, a lignin-derived aromatic monomer yield, a material composition in the pulp solid, and a delignification degree in Present Examples and Comparative Examples were measured, and the results are shown in Table 4.

In this connection, the yields of the collected products (DCM soluble organic material (DSO), water-soluble organic material (WSO), pulp solid), and the lignin-derived aromatic monomer yield are calculated using following equations.

$$\text{Yield of } DSO \text{ (wt \%)} = \frac{\text{Weight of dried } DSO}{\text{Weight of dryash} - \text{free feedstock}} \times 100\%$$

$$\text{Yield of } WSO \text{ (wt \%)} = \frac{\text{Weight of dried } WSO}{\text{Weight of dryash} - \text{free feedstock}} \times 100\%$$

Yield of pulp – rich solid (wt %) =

$$\frac{\text{Weight of } solidresidue - \text{Weight of catalyst}}{\text{Weight of dryash} - \text{free feedstock}} \times 100\%$$

Aromatic monomer yield (wt %) =

$$\frac{\text{selectivity(\%) of aromatic monomer} \times \text{lignin oil amount}}{\text{lignin amount}}$$

TABLE 4

Monomers (structures):
- 1: 4-n-propyl-guaiacol (P-G)
- 2: 4-n-propenyl-guaiacol (P=G)
- 3: 4-n-propanol-guaiacol (POH-G)
- 4: 4-n-propyl-syringol (P-S)
- 5: 4-n-propenyl-syringol (P=S)
- 6: 4-n-propanol-syringol (POH-S)

| Reaction Condition | Product yield [wt %] | | | Lignin-derived aromatic monomer (LDPMs) [C %] | | | | | | | | Pulp solid composition (wt %) | | | Delignification degree [wt %] |
|---|---|---|---|---|---|---|---|---|---|---|---|---|---|---|---|
| | Pulp | DSO | WSO | P-G (1) | P=G (2) | POH-G (3) | P-S (4) | P=S (5) | POH-S (6) | Others | Total | Glucan | Xylan | Lignin | |
| Comparative Example 1-1 | 5 wt % Pd/C + 3 MPa H₂ | 63.7 | 20.7 | 7.05 | 3.47 | N.D. | 6.52 | 7.10 | 0.54 | 8.48 | 3.89 | 30.0 | 85.8 | 42.1 | 25.0 | 75.0 |
| Comparative Example 1-2 | Ni₁—Al/AC + 3 MPa H₂ | 60.3 | 20.7 | 7.24 | 1.96 | N.D. | 2.12 | 5.20 | 0.30 | 4.52 | 2.50 | 16.6 | 88.7 | 43.1 | 22.1 | 77.9 |
| Present Example 1-1 | Ni₁—Al/AC + HCOOH | 45.5 | 33.1 | 10.5 | 4.80 | 2.20 | 0.47 | 9.28 | 3.87 | 0.56 | 2.22 | 23.4 | 77.9 | 15.5 | 14.8 | 85.2 |

TABLE 4-continued

Monomer 1. 4-n-propyl-guaiacol (P-G)
2. 4-n-propenyl-guaiacol (P-G)
3. 4-n-propanol-guaiacol (POH-G)
4. 4-n-propyl-syringol (P-S)
5. 4-n-propenyl-syringol (P = S)
6. 4-n-propanol-syringol (POH-S)

| Reaction Condition | Product yield [wt %] | | | Lignin-derived aromatic monomer (LDPMs) [C %] | | | | | | | | Pulp solid composition (wt %) | | | Delignification degree [wt %] |
|---|---|---|---|---|---|---|---|---|---|---|---|---|---|---|---|
| | Pulp | DSO | WSO | P-G (1) | P= G (2) | POH- G (3) | P-S (4) | P= S (5) | POH- S (6) | Others | Total | Glucan | Xylan | Lignin | |
| Comparative Example 1-3: 5 wt % Pd/C + HCOOH | 49.6 | 24.8 | 8.47 | 1.47 | 0.07 | 8.08 | 4.42 | 0.53 | 13.51 | 1.72 | 29.8 | 80.5 | 8.7 | 27.1 | 72.9 |
| Comparative Example 1-4: W/O catalyst | 43.4 | 31.0 | 16.7 | <0.01 | 0.08 | 0.02 | 0.04 | 0.18 | 0.02 | 1.83 | 2.18 | 75.2 | 7.7 | 7.4 | 92.6 |
| Comparative Example 1-5: 30 wt % Ni/AC + + HCOOH | 45.5 | 33.1 | 16.8 | 0.19 | 1.17 | N.D. | 0.18 | 1.44 | N.D. | 1.92 | 4.90 | 77.9 | 8.8 | 6.3 | 93.7 |
| Comparative Example 1-6: 30 wt % Ni/AC + γ-Al$_2$O$_3$ + HCOOH | 45.5 | 35.1 | 18.8 | 0.08 | 0.69 | N.D. | 0.07 | 0.60 | N.D. | 1.90 | 3.34 | 77.2 | 3.1 | 15.9 | 84.1 |
| Comparative Example 1-7: Raney Ni + HCOOH | 43.4 | 33.1 | 11.6 | 1.27 | 2.48 | 0.39 | 2.43 | 6.15 | 0.30 | 1.38 | 14.4 | 66.5 | 4.4 | 10.9 | 89.1 |
| Comparative Example 1-8: Ni/AC + W/O HCOOH | 82.7 | 16.5 | 6.36 | 0.69 | 3.32 | 0.99 | 0.69 | 3.75 | 0.94 | 1.52 | 11.9 | 83.0 | 19.2 | 50.7 | 49.3 |

Referring to Table 4, a total aromatic monomer yield of Comparative Example 1-1 using Pd/C catalyst under the presence of external hydrogen was confirmed to be 30.0 C %. 4-n-propyl guaiacol/syringol (P-G and P-S), and 4-n-propanol guaiacol/syringol (POH-G and POH-S) were identified as main products of DSO. A small number of products included small amounts of oxidized linear/branched hydrocarbons and furans as produced by decomposition of cellulose alone. In addition, an amount of glucan in the pulp solid was large (85.8 wt %), but 42.1 wt % of xylan was extracted from the pulp solid, and 25w % of the natural lignin was contained therein.

In Comparative Example 1-2 using Ni$_1$—Al/AC catalyst of Present Example 2 in the presence of external hydrogen, the delignification degree and the glucan content in the pulp solid were found to be quite similar to those in Comparative Example 1-1. However, it was confirmed that a total aromatic monomer yield in Comparative Example 1-2 was 16.6 C % and thus was low.

Further, it was confirmed that, in Present Example 1-1 using $Ni_1$—Al/AC catalyst of Present Example 2, and using a solvent including formic acid, a type of the aromatic monomer as produced was different from that of Comparative Example 1-1. Specifically, in Present Example 1-1, a significant amount of 4-n-propenyl guaiacol/syringol (P=G and P=S) was generated, while POH-G and POH-S yields were significantly reduced.

This is because the $Ni_1$—Al/AC catalyst of Present Example 1-1 acts as an excellent hydrogen-addition deoxygenating agent. Therefore, the $Ni_1$—Al/AC catalyst of Present Example 1-1 may effectively remove a propenyl OH group, compared to the Pd/AC catalyst of Comparative Example 1-1.

Further, after hydrogen-addition deoxygenation of propenyl alcohol, a hydrogen-deficient reaction medium may inhibit hydrogenation of double bonds because a limited amount of molecular hydrogen is generated via decomposition of the formic acid present in Present Example 1-1.

In Present Example 1-1, a total aromatic monomer yield was 23.4 C %, which was lower than 30.0 C % of Comparative Example 1-1. In Present Example 1-1, glucan and xylan contents in the pulp solid were 77.9 wt % and 15.5 wt % respectively, which were lower than 85.8 wt % and 42.1 wt % of Comparative Example 1-1, respectively. From this result, increase in the decomposition of cellulose (alone) under an acidic condition may be expected. That is, a larger amount of linear/branched hydrocarbons and furans were detected in Present Example 1-1, compared to Comparative Example 1-1, while the delignification degree was 85.2 wt % in Present Example 1-1, which was much higher than 75.0 wt % of Comparative Example 1.

In Comparative Example 1-3, a total aromatic monomer yield was high (29.8 wt %), and POH-G/POH-S were main aromatic monomer products, as in Comparative Example 1-1. In Comparative Example 1-3, xylan decomposition increased as in Present Example 1-1. However, in Comparative Example 1-3, the delignification degree was 72.9 wt %, which was lower than 85.2 wt % of Present Example 1-1.

In Comparative Example 1-4 where the conversion reaction was performed in the absence of the catalyst in order to identify the role of the catalyst, the delignification degree was very high, that is, 92.6 wt %, but the total aromatic monomer yield was very low, that is, 2.18%. Thus, it was identified that a solvothermal synthesis reaction in the mixed solution containing the formic acid was very effective to the delignification, but the presence of the catalyst was an important factor in decomposing the solubilized lignin fraction into aromatic monomers, and stabilizing a fractionated aromatic monomer.

Further, in Comparative Examples 1-5 and Comparative Example 1-6 using Comparative Examples 2 and 3 as catalysts respectively, under the presence of formic acid, the DSO yield and the glucan content were similar to those of Present Example 1-1, whereas the total aromatic monomer yield in each of Comparative Examples 1-5 and Comparative Example 1-6 was much lower (<5 C %) than that of Present Example 1-1. In Comparative Example 1-7, a smaller glucan content (66.5%) and a lower total aromatic monomer yield (14.4 C %) were exhibited.

Therefore, it may be identified that, in Present Example 1-1, the use of the catalyst according to Present Example 2 of the present disclosure may allow producing the aromatic monomer at a high yield in the mixed solution of ethanol, water and formic acid when there is no external hydrogen.

In Comparative Example 1-8 in which the reaction was performed in the absence of the formic acid, the DSC yield was reduced to 16.5 wt % and the delignification degree was also reduced to 49.3 wt %, as compared to Present Example 1-1. In Comparative Example 1-8, the total aromatic monomer yield was also reduced to 11.9 C %. Based on those results, it may be identified that the presence of the formic acid may allow the effective delignification and the high yield production of the aromatic monomer.

That is, the formic acid promotes cleavage of carbohydrate-lignin bonds (ester and ether), thereby enhancing extraction of a lignin fraction from a cell wall matrix. Further, the hydrogen generated via the formic acid decomposition may promote lignin decomposition to break down a β-O-4 bond and may stabilize the aromatic monomer via a double bond hydrogenation reaction.

Therefore, it has been identified that effective catalyst decomposition due to the presence of the formic acid to produce hydrogen in the stabilization of the aromatic monomer may contribute to the increase in the total aromatic monomer yield.

FIGS. 7A-7D shows results of analyzing DSO characteristics of Present Example 1-1, using GPC (Gel Permeation Chromatography), TGA (Thermogravimetric Analysis), and 2D HSQC NMR. In this connection, a GPC profile of the DSO may be deconvolved into at least 4 peaks (See FIG. 7A).

A peak centered on a retention time of 20 minutes corresponds to a molecular weight of the aromatic monomer. This may be identified based on the GPC profile of P-G. The molecular weight of P-G at the peak refers to a value relative to a disperse polystyrene standard, and is 181 g/mol. This value is similar to an average molecular weight of an aromatic monomer (185 g/mol). Relative molecular weights of peaks respectively centered on retention times of 19.3 minutes and 19.0 minutes are approximately 2 times (421 g/mol) and 3 times (669 g/mol) of the aromatic monomer molecular weight, respectively which are associated with dimer and trimer, respectively.

A monomer fraction based on an area percentage of the GPC profile was 31%. Fractions of dimer, trimer and oligomer in DSO were 12%, 21% and 37%, respectively.

Figure 7A:
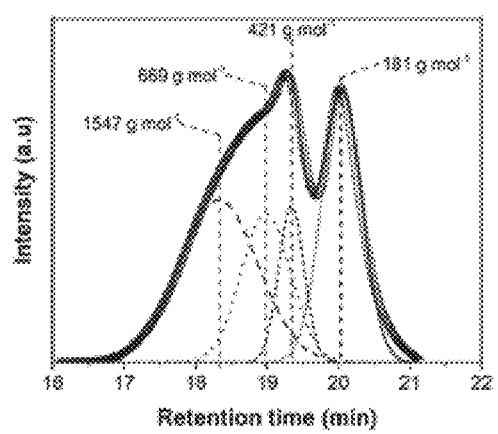
FIGS. 7A-7D are diagrams respectively showing results of analyzing characteristics of DSO separated according to the embodiment of the present disclosure, using GPC (Gel Permeation Chromatography), TGA (Thermogravimetric Analysis) and 2D HSQC NMR (Heteronuclear Single Quantum Coherence Nuclear Magnetic Resonance).
Figure 7B:
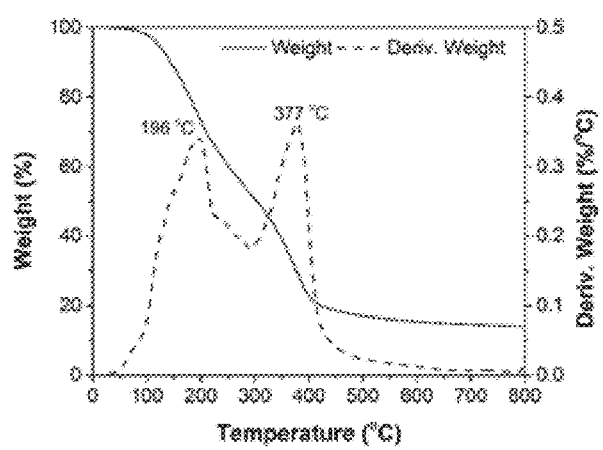

TGA and derivative TG profiles of DSO collected under a nitrogen flow condition indicate two major mass reduction regions (see FIG. 7B). A peak at 196° C. may be attributed to evaporation of the aromatic monomer and a portion of DCM soluble cellulose (alone) induced light fraction.

Figure 7C:
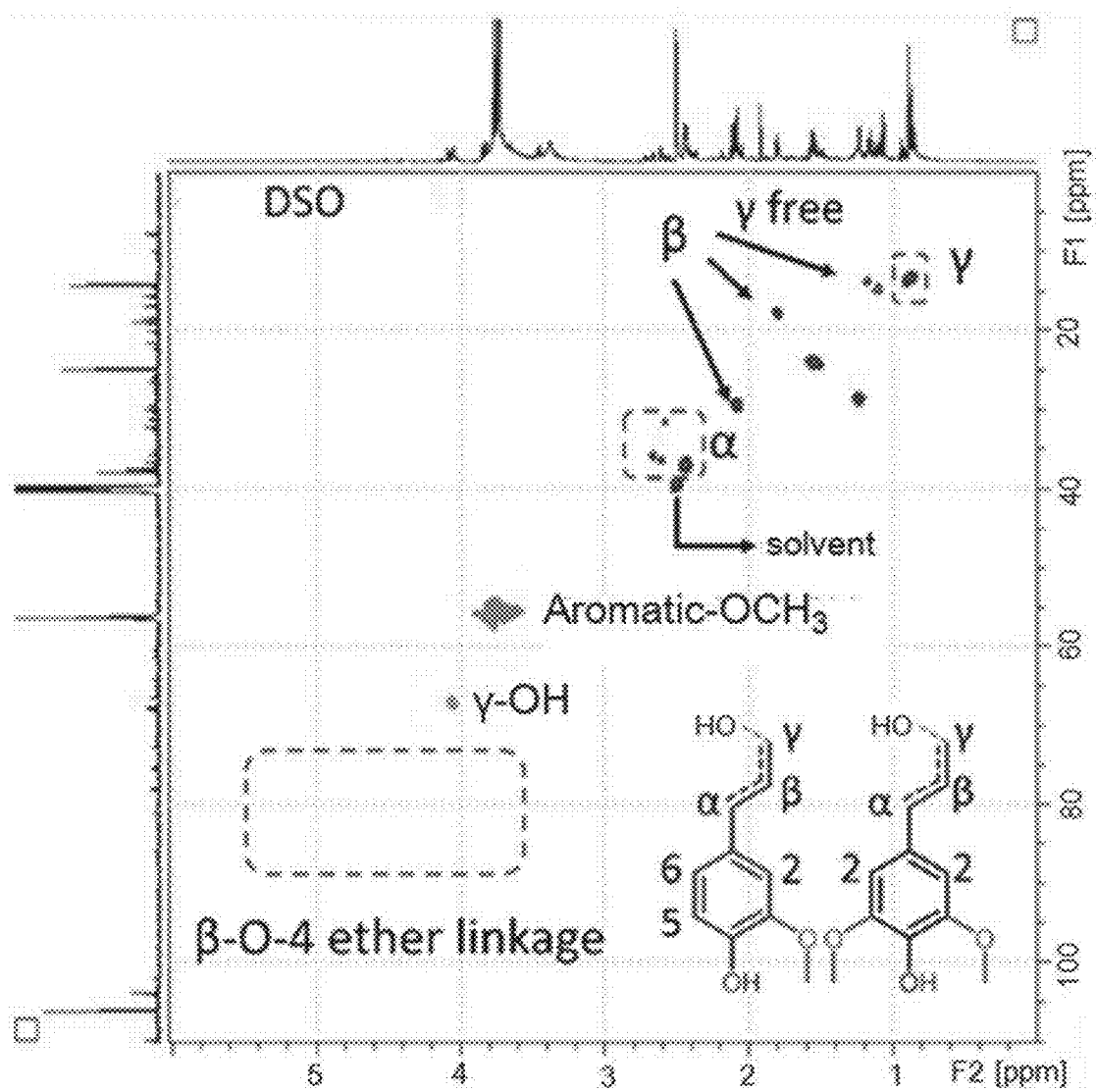
Figure 7D:
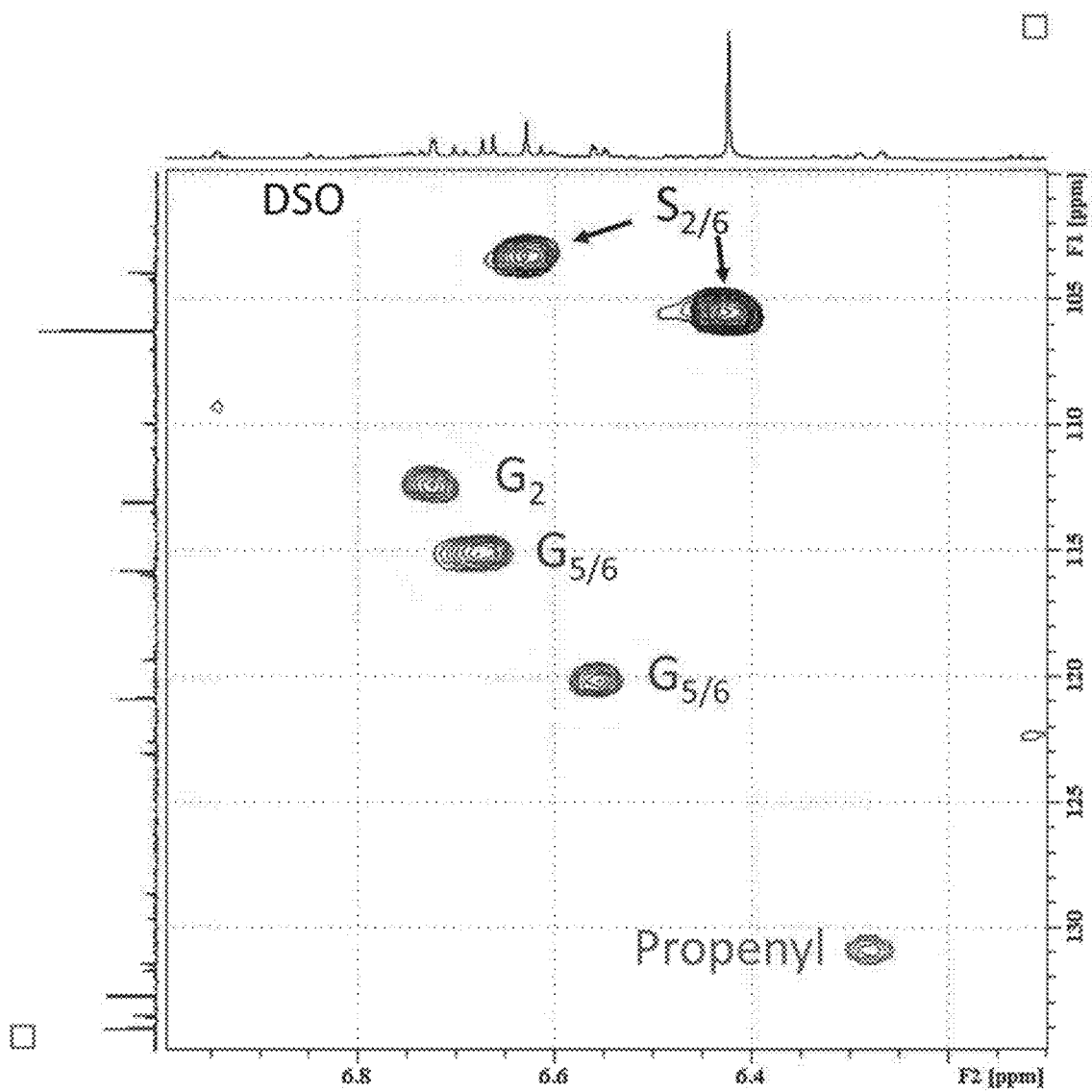

A main decomposition peak at 377° C. indicates that thermally unstable bonds are broken, and dimers, trimers and oligomers may be thermally decomposed. As shown in FIGS. 7C-FIG. 7D, a 2D HSQC NMR spectrum shows that the aromatic monomers dominant in DSO are P-G, P=G, P-S and P=S. Further, the absence of α/β ether bonds in DSO indicates that substantially complete decomposition of ether bonds of natural lignin using the $Ni_1$—Al/AC of Present Example 2 results in the high yield of the aromatic monomers.

Effect of Formic Acid on Conversion Reaction of Lignin of Woody Biomass Material to Aromatic Monomer Experimental Example 3

Effect of Formic Acid

To identify the effect of the formic acid on the catalyst in the conversion reaction, the conversion reaction was performed in the same manner as in Present Example 1-1, except that various solutions as shown in Table 5 below were used for $Ni_2$—Al/AC catalyst of Present Example 3.

TABLE 5

|  | Solution | Presence or absence of hydrogen gas | Catalyst |
|---|---|---|---|
| Present Example 2-1 | HCOOH | — | $Ni_2$—Al/AC |
| Comparative Example 2-1 | $CH_3COOH$ | — | $Ni_2$—Al/AC |
| Comparative Example 2-2 | — | 3 MPa $H_2$ | $Ni_2$—Al/AC |
| Comparative Example 2-3 | HCOOH | 3 MPa $H_2$ | $Ni_2$—Al/AC |
| Comparative Example 2-4 | $CH_3COOH$ | 3 MPa $H_2$ | $Ni_2$—Al/AC |

Thereafter, a product yield (FIG. 8A), a material composition of a pulp solid, and a delignification degree (FIG. 8B), a lignin-derived aromatic monomer yield (FIG. 8C), a gas composition (FIG. 8D), and a conversion reaction mechanism (FIG. 8E) according to the Present Example and Comparative Examples are shown in FIGS. 8A-8E.

Figure 8A:
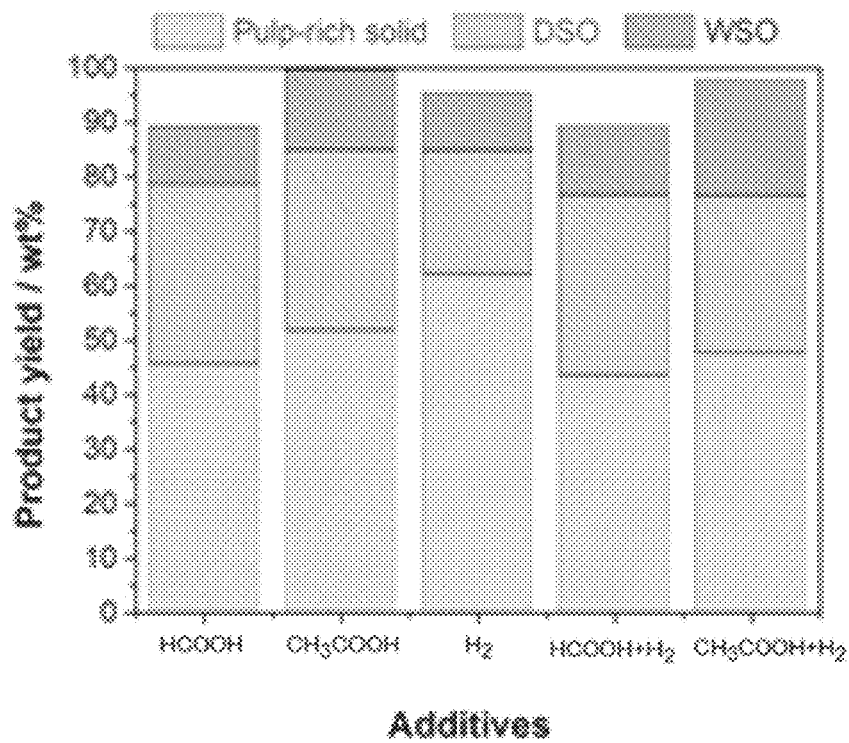
FIGS. 8A-8E are diagrams respectively showing results of performing a conversion reaction using formic acid and comparative solutions for a catalyst according to an embodiment of the present disclosure.
Figure 8B:
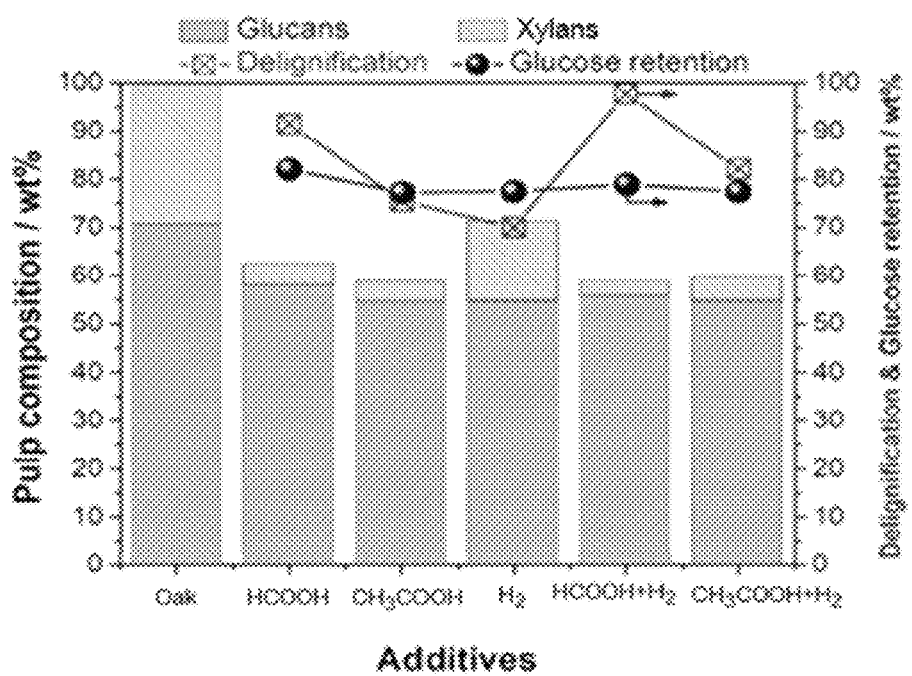
Figure 8B:
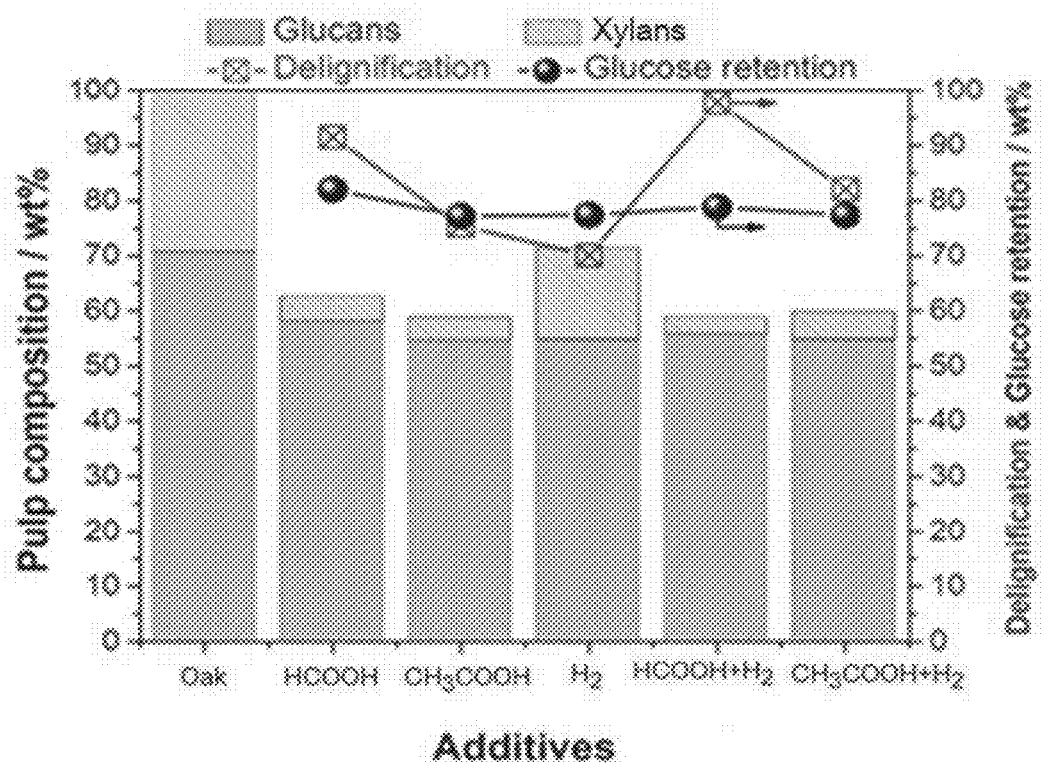
Figure 8C:
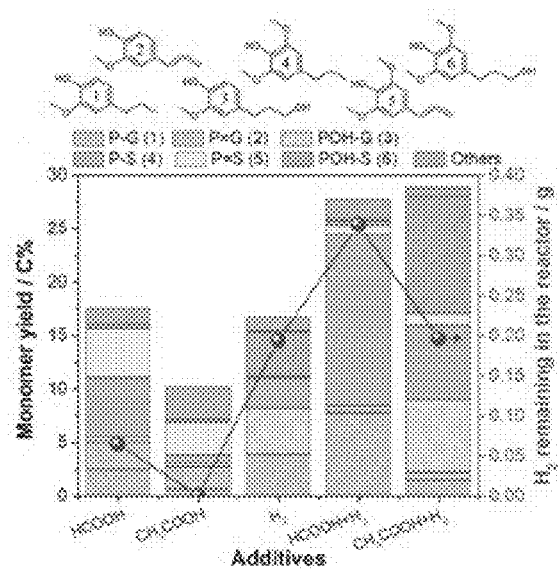
Figure 8D:
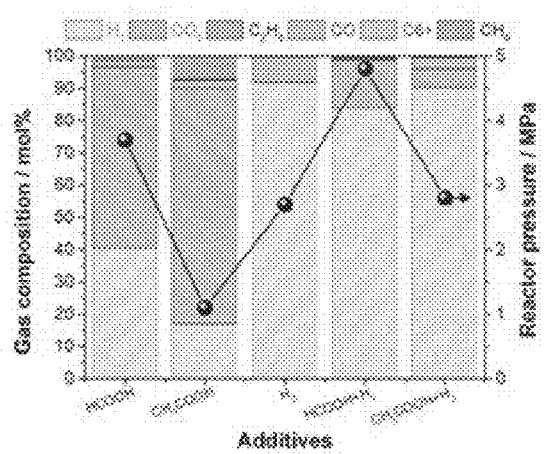

Referring to FIGS. 8B-8D, in Comparative Example 2-1 using acetic acid, an amount of hydrogen remaining inside the reactor was a negligible amount (<0.001 g) (see FIG. 8C). As shown in FIG. 8D, $CO_2$ was rich in a reactor head. It may be seen that, under this hydrogen deficiency condition, a lignin fraction separated by the solvent was not effectively decomposed into stable aromatic monomers, resulting in a low yield (10.1 C %) of the aromatic monomer (see FIG. 8C).

On the other hand, in Present Example 2-1 using the formic acid, hydrogen was generated due to the decomposition of the formic acid, resulting in a higher aromatic monomer yield (17.5 C %) than that of Comparative Example 2-1.

In Comparative Example 2-2 using 3 MPa hydrogen in the absence of an organic acid, a DSO yield was lower than that of Present Example 2-1. A yield of the aromatic monomer in Comparative Example 2-2 was similar to that of Present Example 2-1.

It has been identified based on the above results that the organic acid may improve solvolysis to contributes to the separation of the lignin from the cell wall structure of the woody biomass material. Further, the hydrogen may activate hydrolysis and bond saturation reactions of lignin at the active site of the Ni-based catalyst, thereby to enhance the production of aromatic monomers.

Further, it may be seen that in Comparative Examples 2-3 and 2-4 using 3 MPa hydrogen in the presence of an organic acid, a higher aromatic monomer yield (28 to 29 C %) was achieved.

Moreover, in the DSO produced according to Comparative Example 2-1, P=G (2) and P=S (5) were main aromatic monomer products. However, in the DSO produced according to Present Example 2-1, PG (1), P=G (2), PS (4) and P=S (5) were main aromatic monomer products (see FIG. 8C)

In contrast, in Comparative Examples 2-2 to 2-4 where hydrogen was used, P-G (1), POH-G (3), P-S (4), and POH-S (6) were the main products.

Figure 8E:
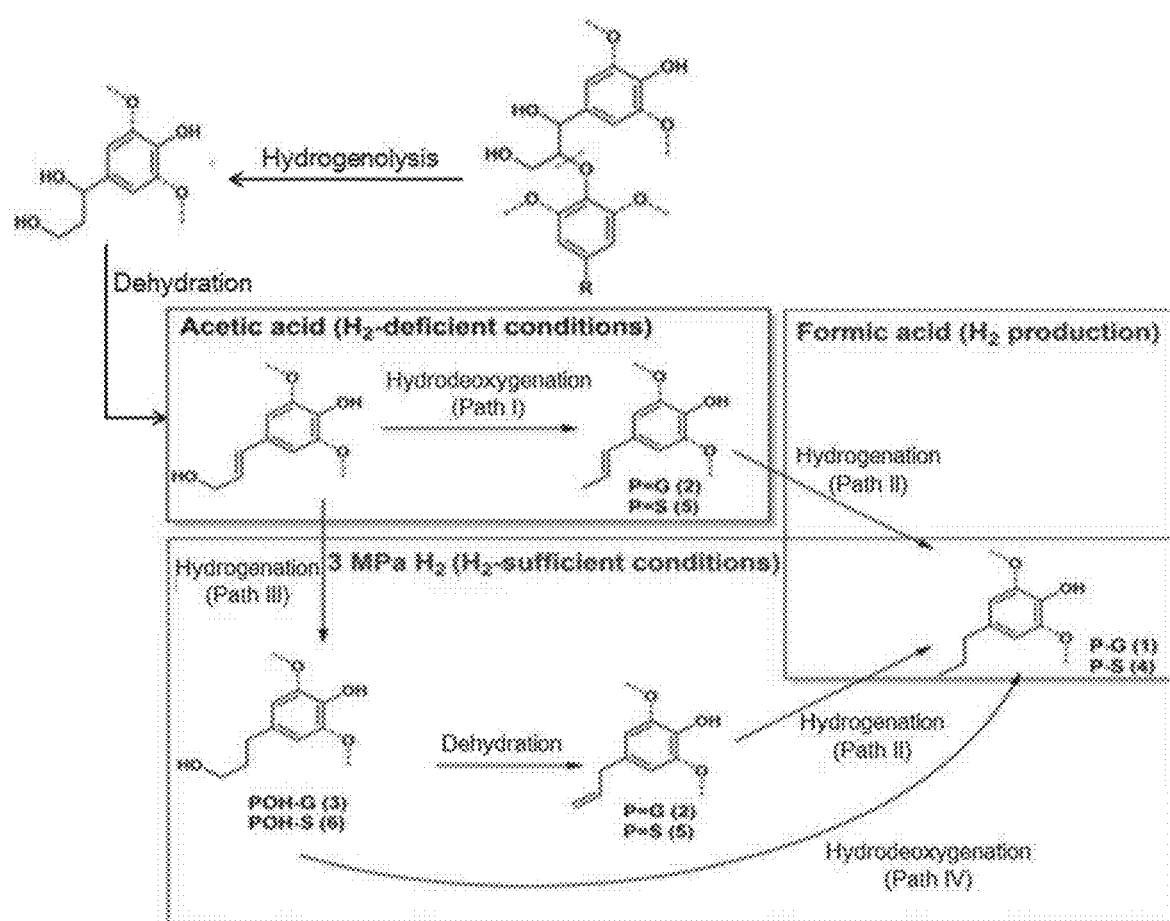

That is, it may be expected that a reaction path varies depending on a reaction environment. A path of the conversion reaction mechanism of the lignin is illustrated in FIG. 8E.

In Comparative Example 2-1, a main reaction was hydrodeoxygenation (path I) of coniferyl/sinapyl alcohol for producing P=G (2) and P=S (5). In Present Example 2-1, the path I followed by hydrogenation of propenyl double bond (path II) results in n-propyl-substituted P-G (1) and P-S (4) from P=G (2) and P=S (5).

On the other hand, in Comparative Examples 2-2 to 2-4 in which hydrogen is rich, hydrogenation of coniferyl/sinapyl alcohol double bond is performed via a path III to obtain propanol-substituted POH-G (3) and POH-S (6). Hydrogenation and deoxygenation of a propanol group may be performed via a path IV to produce n-propyl-substituted P-G (1) and P-S (4).

In Comparative Example 2-3, P-G (1) and P-S (4) were predominant aromatic monomers which have additional molecular hydrogen. This may improve the hydrogenation of a propenyl double bond at P=G and P=S.

In contrast, in Comparative Example 2-4, significant residues amounts of POH-G (3) and POH-S (6) were found in DSO. This is due to the fact that only acetic acid was used.

With regard to the acetic acid, a high Brønsted acidity of the formic acid may allow forming an ion pair intermediate to improve the hydrogenation and deoxygenation of the propyl OH group.

Experimental Example 4

Effect Based on Change in Amount of Formic Acid

In order to identify an effect of the change in the amount of the formic acid on the catalyst in the conversion reaction, the amount of formic acid as introduced varied to 3 ml, 4 ml, 5 ml, and 6 ml, based on a content of $Ni_2$—Al/AC catalyst of Present Example 3, and then the conversion reaction was performed using the method of Present Example 1-1. After the conversion reaction, a resulting product yield (FIG. 9A), a material composition in a pulp solid, and a delignification degree (FIG. 9B), a lignin-derived aromatic monomer yield (FIG. 9C), and a gas composition (FIG. 9D) were measured and the results thereof are shown in FIG. 9.

Referring to FIGS. 9A-9D, as the amount of the formic acid was changed from 3 ml to 6 ml, the DSO yield gradually increased from 24.8 wt % to 33.1 wt %, while the yield of the pulp solid gradually decreased from 53.7 wt % to 39.3 wt %.

The delignification degree increased slightly from 88.6 wt % to 93.7 wt % when the amount of the formic acid was increased from 3 ml to 4 ml. The delignification degree had little increase when the amount of the formic acid is larger than 4 ml.

On the other hand, when the amount of the formic acid increased from 3 ml to 6 ml, the xylan content decreased, and the glucan content decreased from 82.1 wt % to 74.9 wt %. This may indicate that cellulose (alone) degradation occurs at a high degree at high concentrations of formic acid.

A xylan decomposition product was present in DSO produced using 6 ml formic acid. Thus, a DSO yield (33.1 wt %) higher than the lignin content (28.8 wt %) of oak tree was achieved.

Figure 9A:
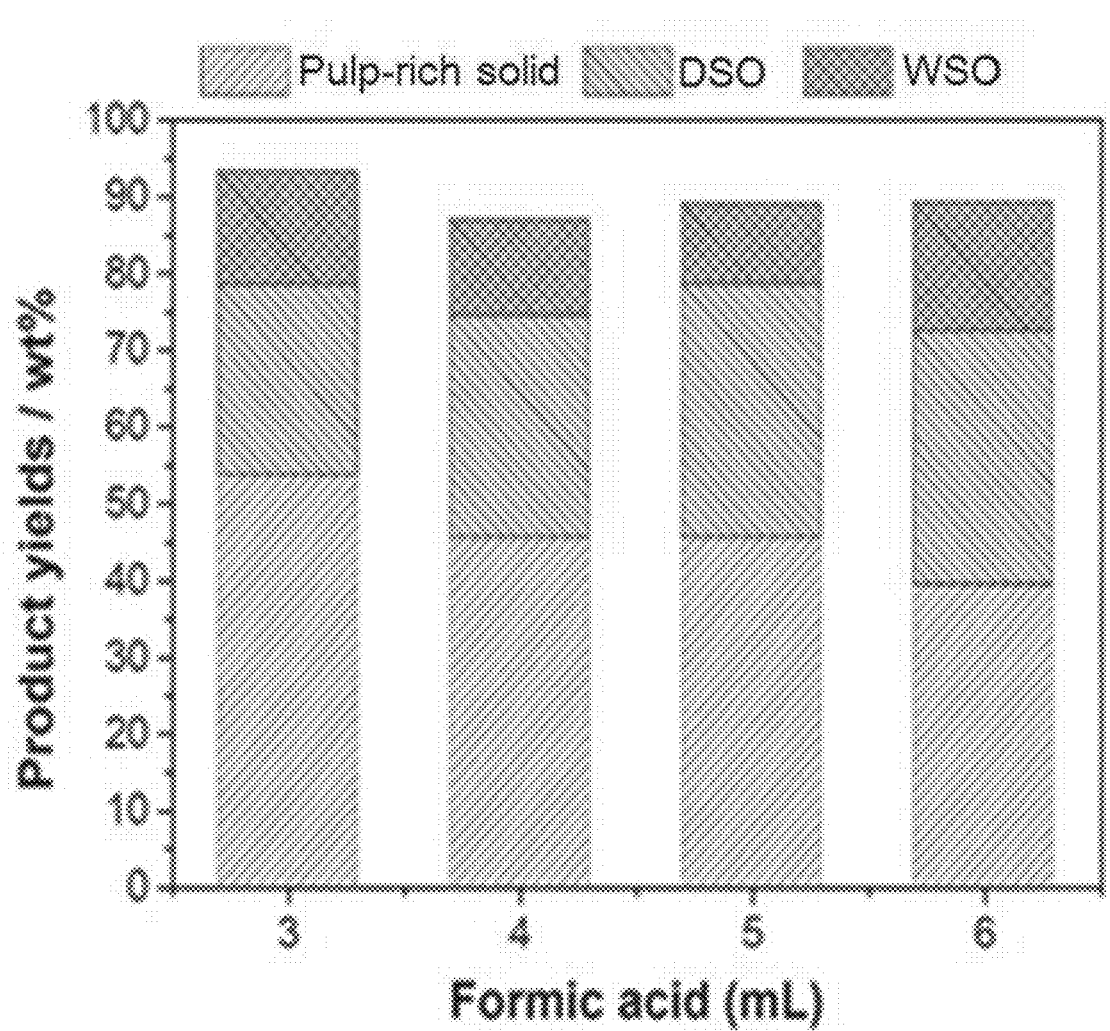
FIGS. 9A-9D are diagrams respectively showing results of performing a conversion reaction based on a varying amount of formic acid for a catalyst according to the embodiment of the present disclosure.
Figure 9B:
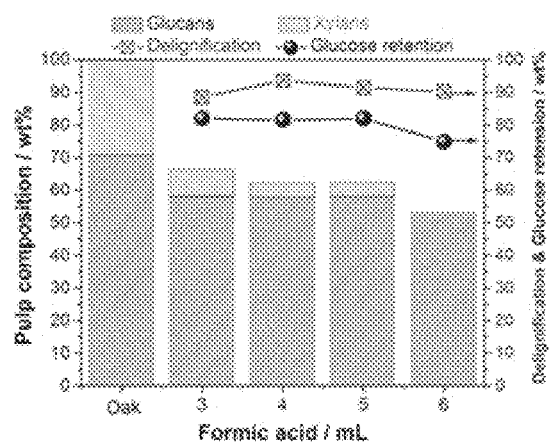
Figure 9C:
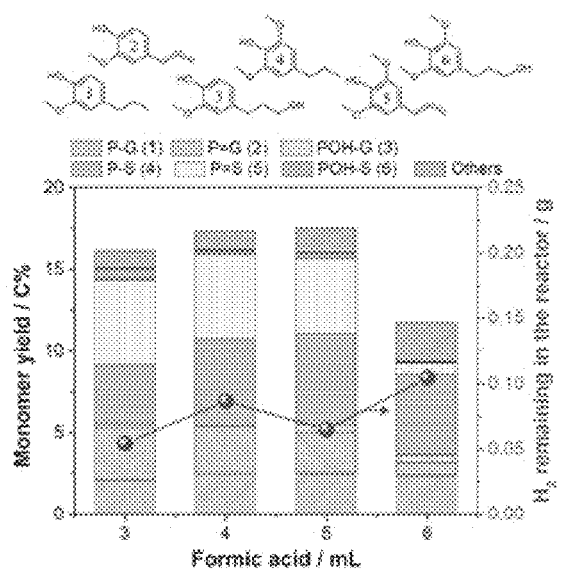
Figure 9D:
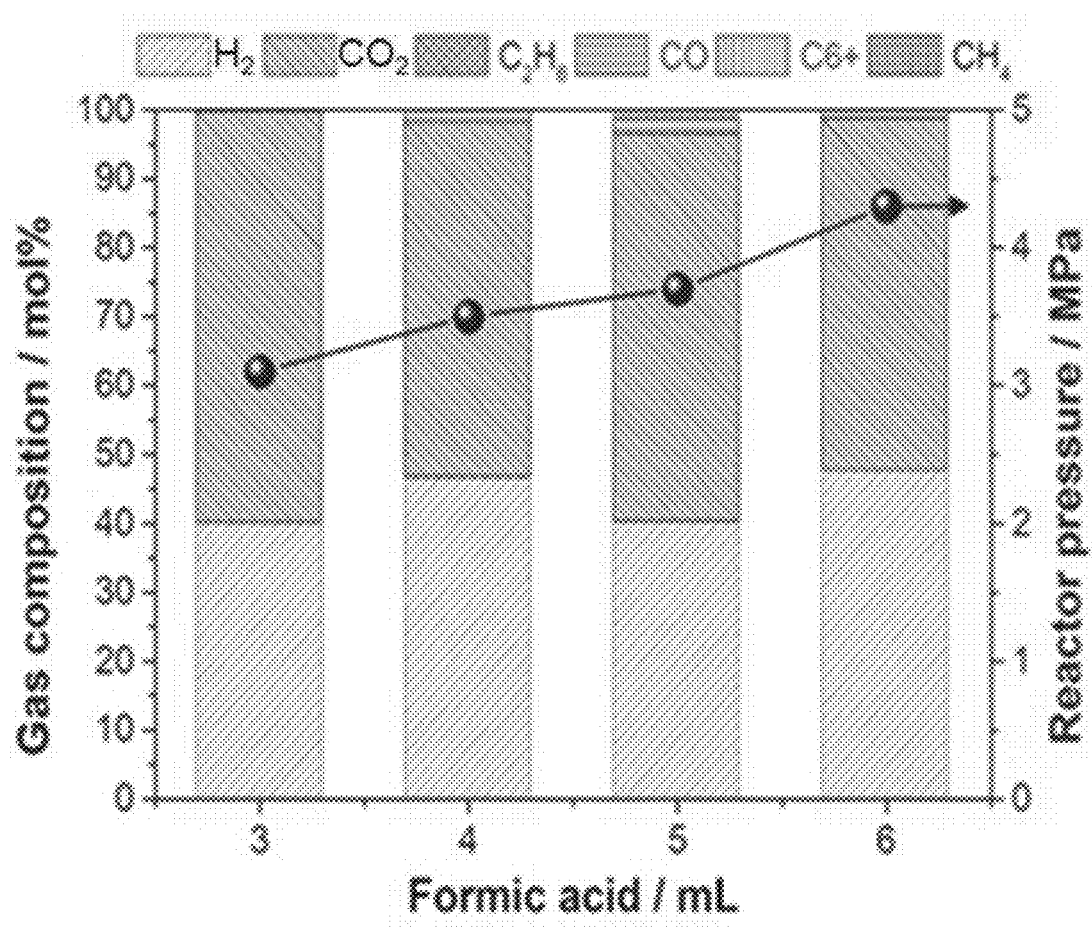

Further, referring to FIG. 9C, the aromatic monomer yield increased from 16.1 C % to 17.5 C % as the formic acid amount increased from 3 ml to 5 ml. However, the aromatic monomer yield decreased to 11.7 C % when the formic acid amount was 6 ml. This means that re-condensation of the lignin-derived aromatic monomer species may occur under a highly acidic condition.

Specifically, as shown in FIG. 9C, it may be identified that when using 3 ml to 5 ml of formic acid, the DSO yield and the yield value of the aromatic monomer are relatively the same as each other. On the other hand, when using 6 ml of formic acid, the amounts of P=G and P=S are significantly reduced. This is believed to be due to the re-condensation reaction to form high molecular weight species. Therefore, the higher amount of hydrogen as produced at higher concentrations of formic acid (FIG. 9D) did not contribute to double bond hydrogenation, and thus did not increase the yield of P-G (1) and P-S (4).

Therefore, in order to collect a pulp solid having a high delignification degree and a high glucan content and, at the same time, to generate the aromatic monomers at a high yield, it is necessary to select a sufficient amount of the formic acid necessary for cleavage of ether-ester bonds between lignin and carbohydrates, and for stabilization of aromatic monomers.

Experimental Example 5

Effect of Ni/Al Molar Ratio of Catalyst on Conversion Reaction

In order to identify the effect of the Ni/Al molar ratio of the catalyst on the conversion reaction, the catalysts of Present Example 1 to Present Example 4 were used, and thus, each conversion reaction was performed via the method of Present Example 1-1 (hereinafter, referred to as Present Examples 3-1, 3-2, 3-3, and 3-4). After the conversion reaction, the resulting product yield (FIG. 10A), a material composition in the pulp solid, and the delignification degree (FIG. 10B), the lignin-derived aromatic monomer yield (FIG. 10C), the amount of hydrogen desorption of $H_2$ TPD at low and high temperatures (FIG. 10D), and the relationship between the Ni catalyst and aromatic monomer production (FIG. 10E) were evaluated, and the results thereof are shown in FIGS. 10A-10E.

Figure 10A:
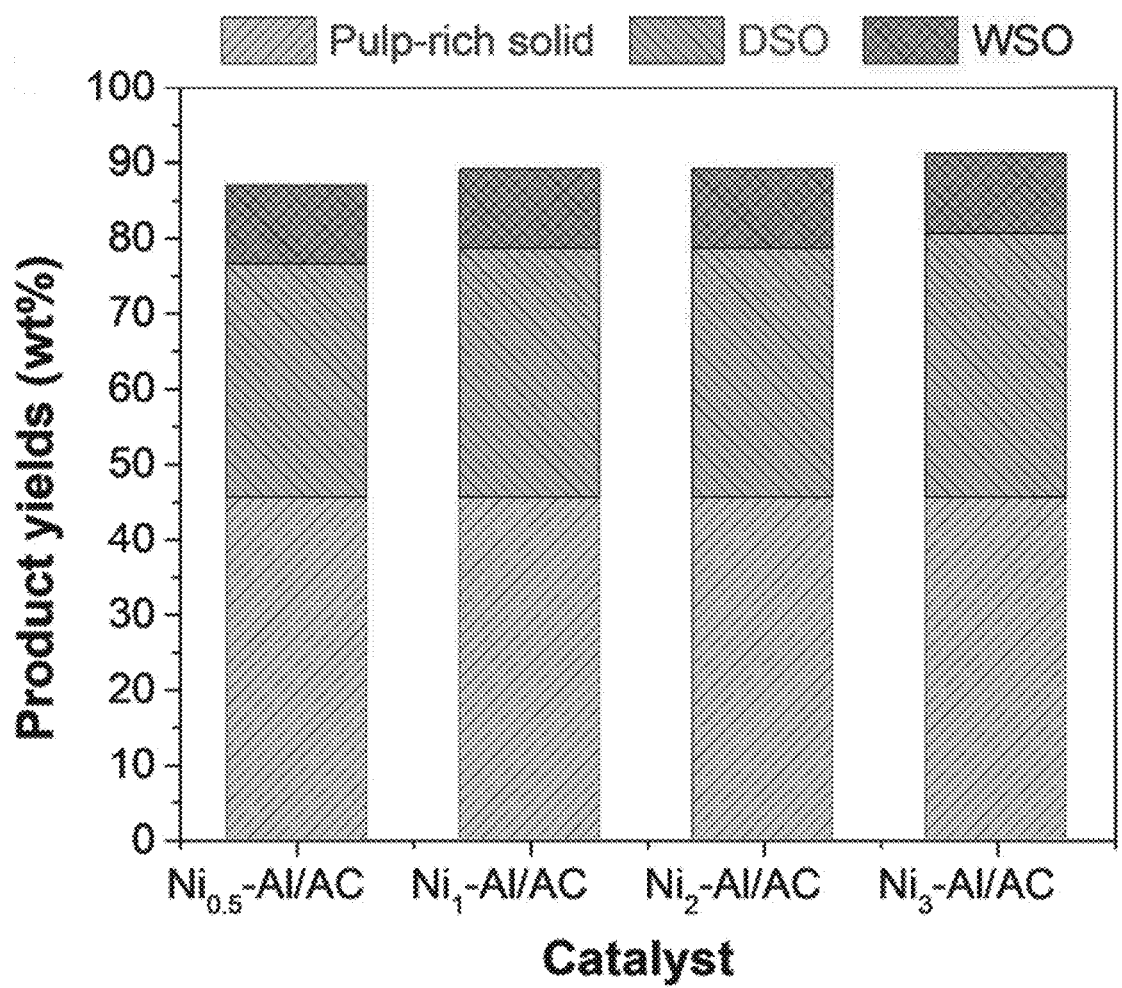
FIGS. 10A-10E are diagrams respectively showing results of performing a conversion reaction, based on a varying Ni/Al molar ratio of a catalyst according to the embodiment of the present disclosure.
Figure 10B:
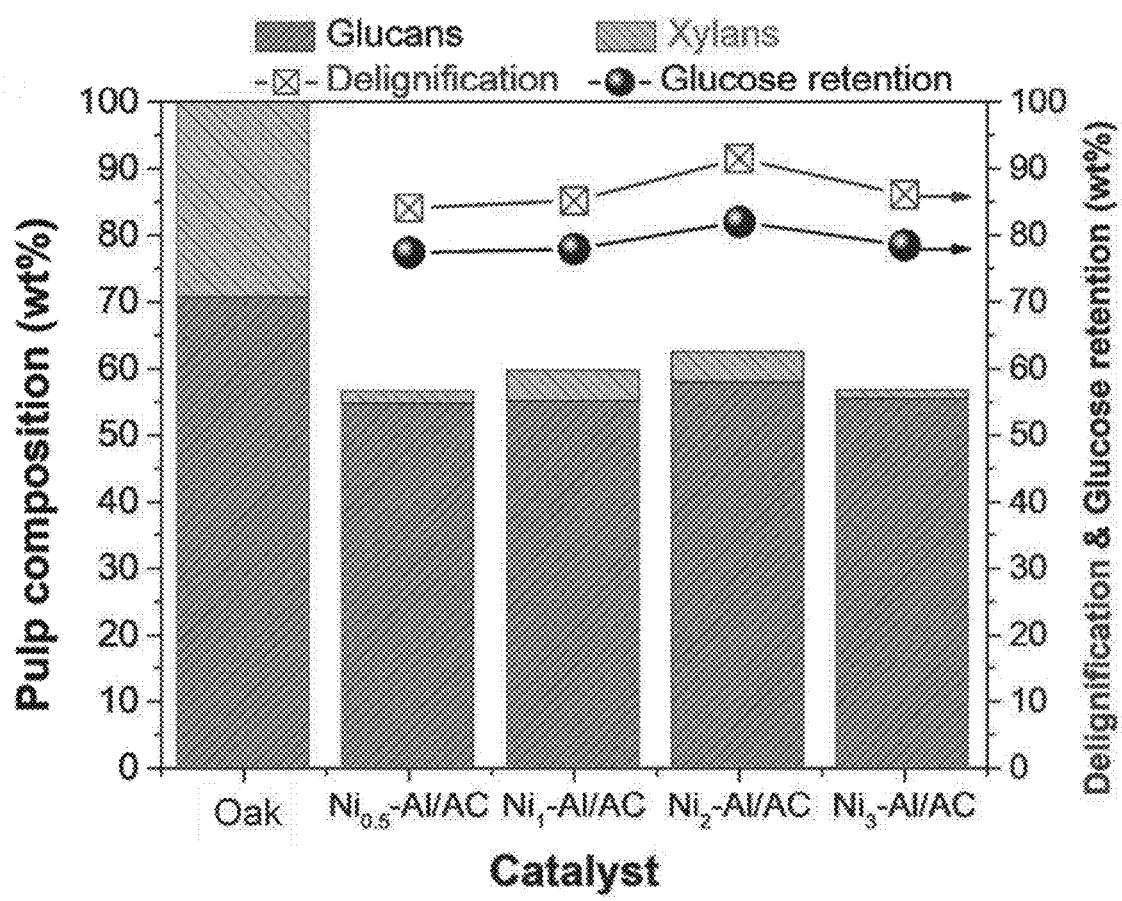

Referring to FIGS. 10A-10B, the pulp solid yield (about 46 wt %), DSO yield (about 33 wt %) and WSO yield (about 11 wt %) were relatively constant between Present Example 3-1 to Present Example 3-4. Further, the delignification degree (about 85 wt %) of the collected pulp, the xylan content (1 to 5 wt %), and the glucan content (about 80 wt %) therein showed constant values between Present Example 3-1 to Present Example 3-4.

To the contrary, the yield of the aromatic monomer changed as the Ni/Al molar ratio changed.

Figure 10C:
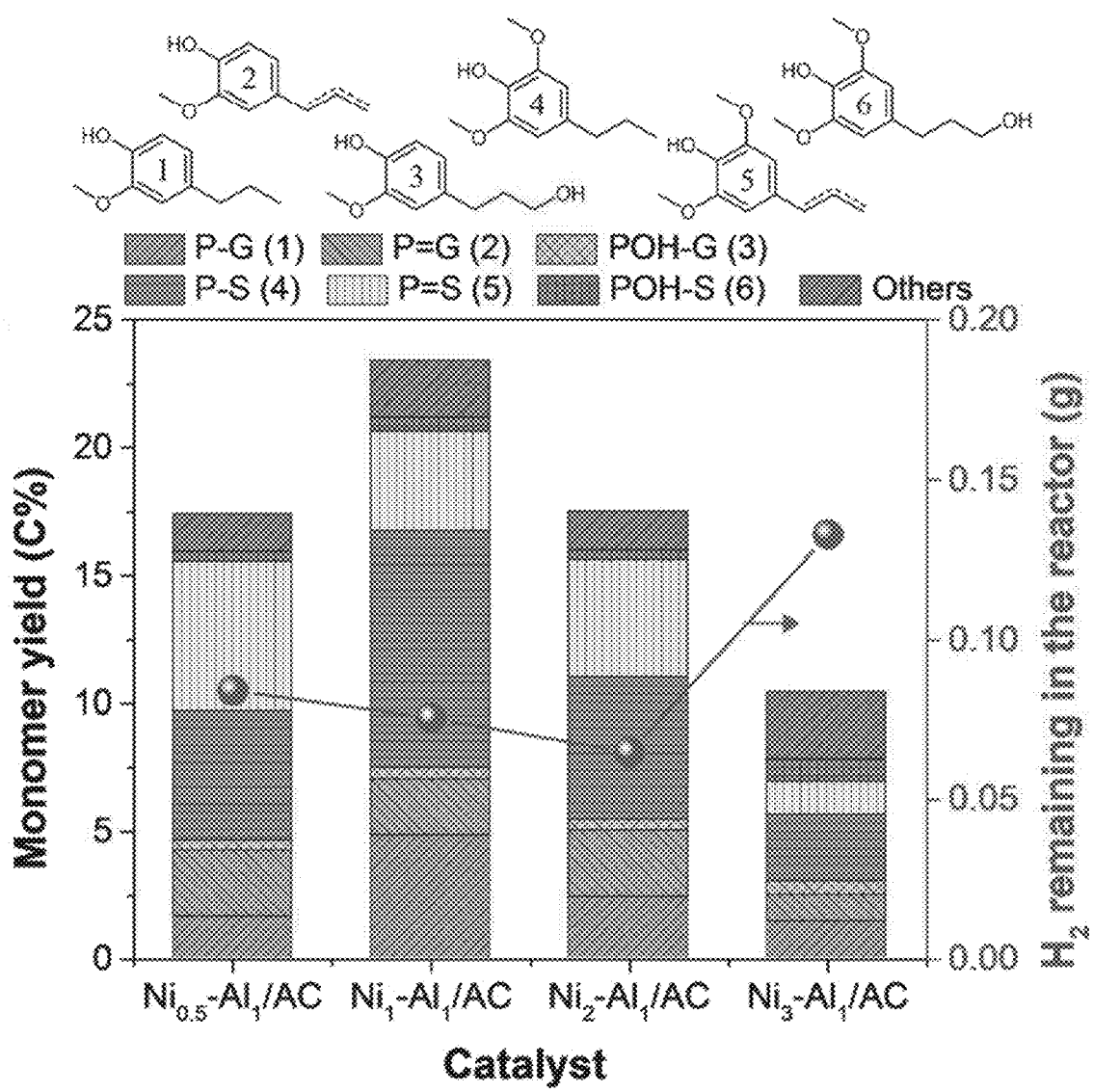

Specifically, referring to FIG. 10C, the yield of aromatic monomer was as follows: Present Example 3-2 (23.4 C %)>Present Example 3-3 (17.5 C %)>Present Example 3-1 (17.4 C %)>Present Example 3-4 (10.4 C %).

Figure 10D:
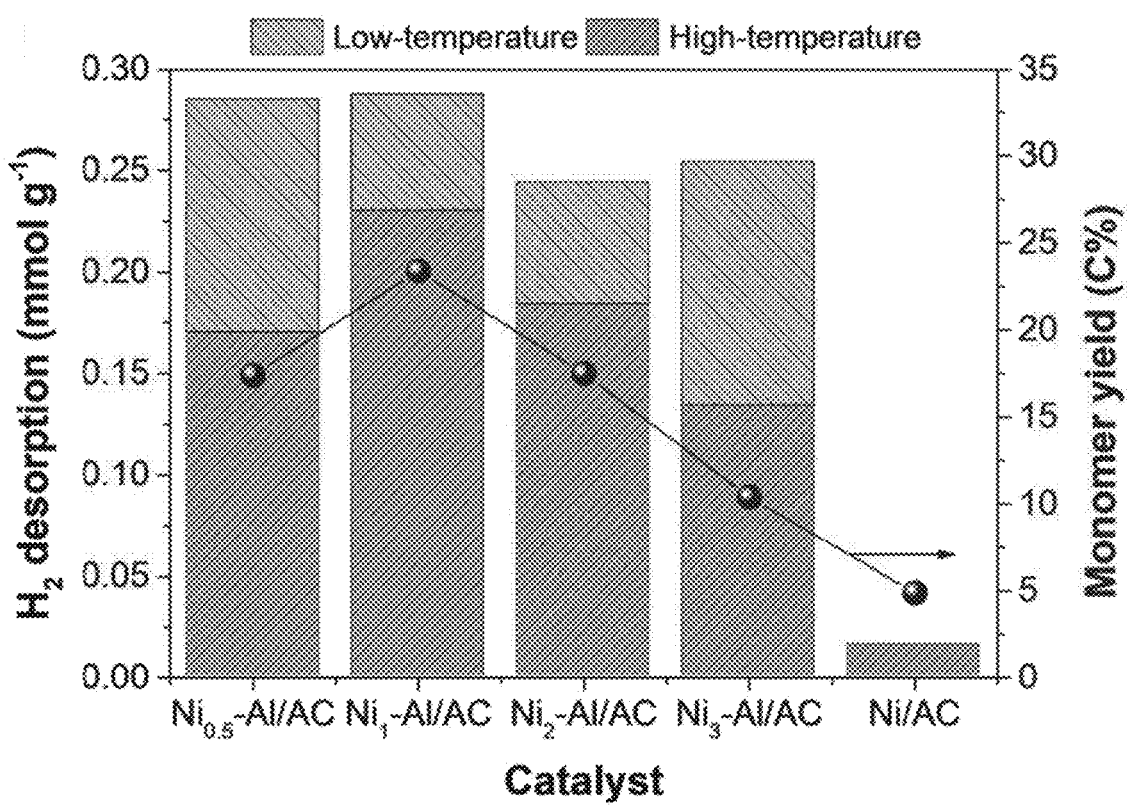

In order to observe differences between the yields of aromatic monomers according to Present Examples 3-1 to 3-4, a hydrogen desorption amount (corresponding to the H2 spillover effect) of the high-temperature $H_2$ TPD in FIG. 10D was compared with the aromatic monomer yield.

From a result of the comparison, it was found that there was a positive correlation between the hydrogen spillover effect and the yield of the aromatic monomers. When considering combination thereof with the Ni weight (Table 2), it may be identified that important design factors for the Ni-based catalyst may include a large Ni weight on the carrier, a small Ni nano-particles size, and a high dispersion of the Ni nano-particles on the carrier. Under these conditions, the catalyst according to the present disclosure enhances the hydrogen spillover effect.

As in 30 wt % Ni/AC catalyst of Comparative Example 2 as produced by the wet impregnation method, agglomeration between the particles during firing results in large metal particle sizes at larger metal weights, when using most of conventional catalyst synthesis approaches (e.g., wet impregnation method, initial wetting method, simultaneous hydrothermal process).

Figure 10E:
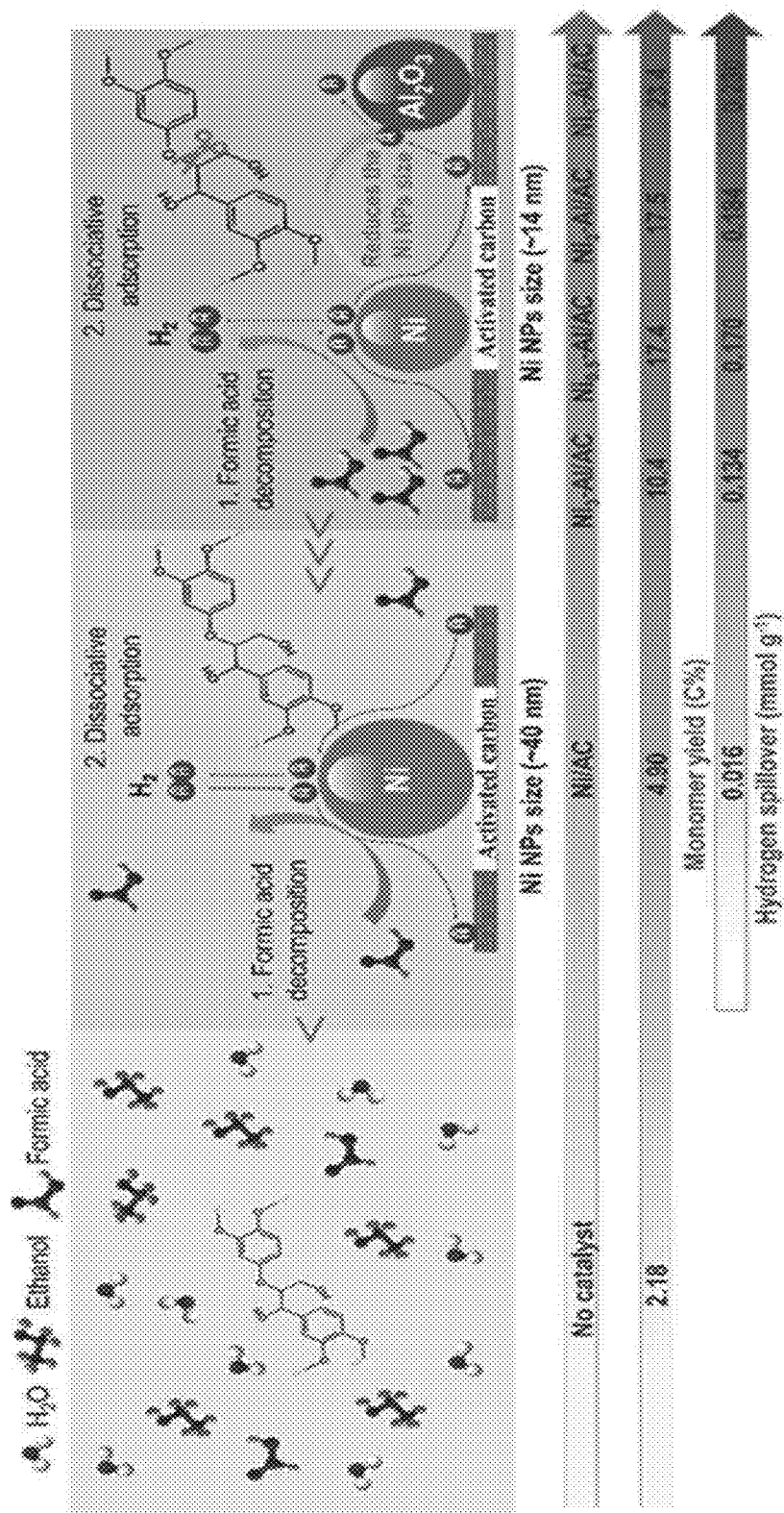

FIG. 10E is a schematic diagram showing the relationship between the Ni catalyst and aromatic monomer formation.

Referring to FIG. 10E, the inhibition of the Ni particle growth by amorphous aluminum oxide that improves the hydrogen spillover effect is a key factor of the Ni-based catalyst. When improving the hydrogenation, and hydrogenation/deoxygenation of the lignin fraction, the yield of aromatic monomers may be increased.

Experimental Example 6

Effect of Reaction Time, Reaction Temperature and Catalyst-to-Feed Ratio on Conversion Reaction In the conversion reaction according to Present Example 3-2, the reaction time, reaction temperature, and catalyst-to-feed ratio were changed individually. The conversion reaction was performed. After the conversion reaction, the resulting product yield (FIGS. 11A, 11D, and 11G), the material composition in the pulp solid and the delignification degree thereof (FIGS. 11B, 11E, and 11H), the lignin-derived aromatic monomer yield and the hydrogen gas amount (FIGS. 11C, 11F, and 11I) were evaluated and the results thereof are shown in FIGS. 11A-11I.

Specifically, in the conversion reaction, the reaction time was 1 hour, 2 hours, 3 hours and 4 hours. The reaction temperature was 170° C., 190° C., 210° C. and 230° C. The catalyst-to-feed ratio was 0.15, 0.2, and 0.3.

Figure 11A:
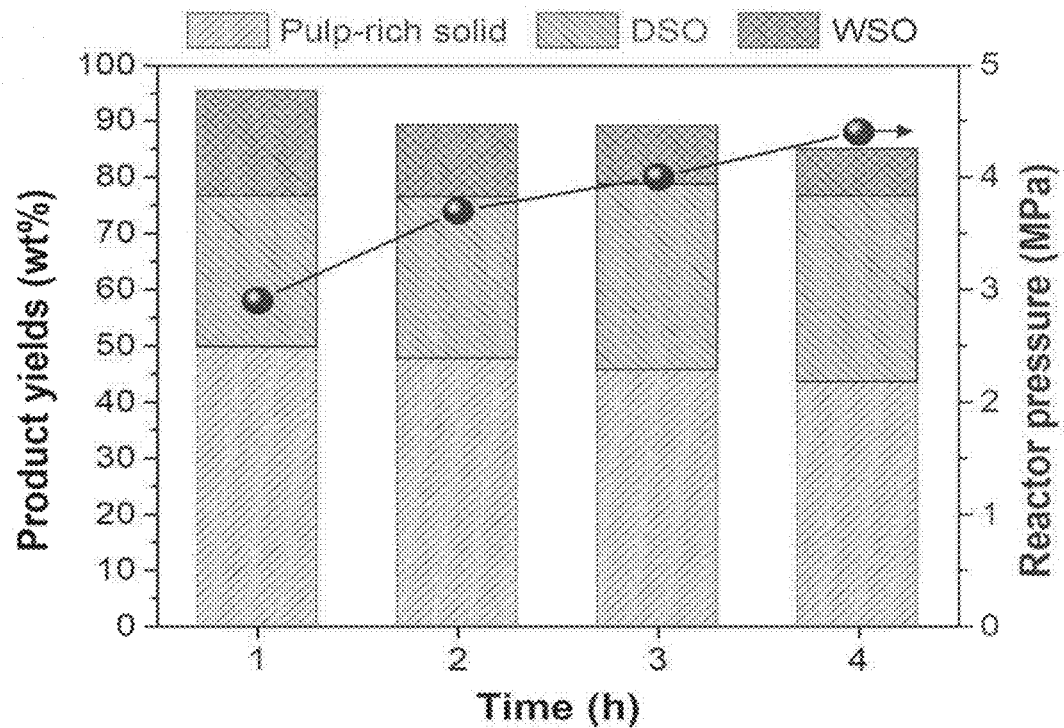
FIGS. 11A-11I are diagrams respectively showing results of performing a conversion reaction, based on varying reaction time, reaction temperature and catalyst-to-feed ratio associated with a catalyst according to the embodiment of the present disclosure.
Figure 11B:
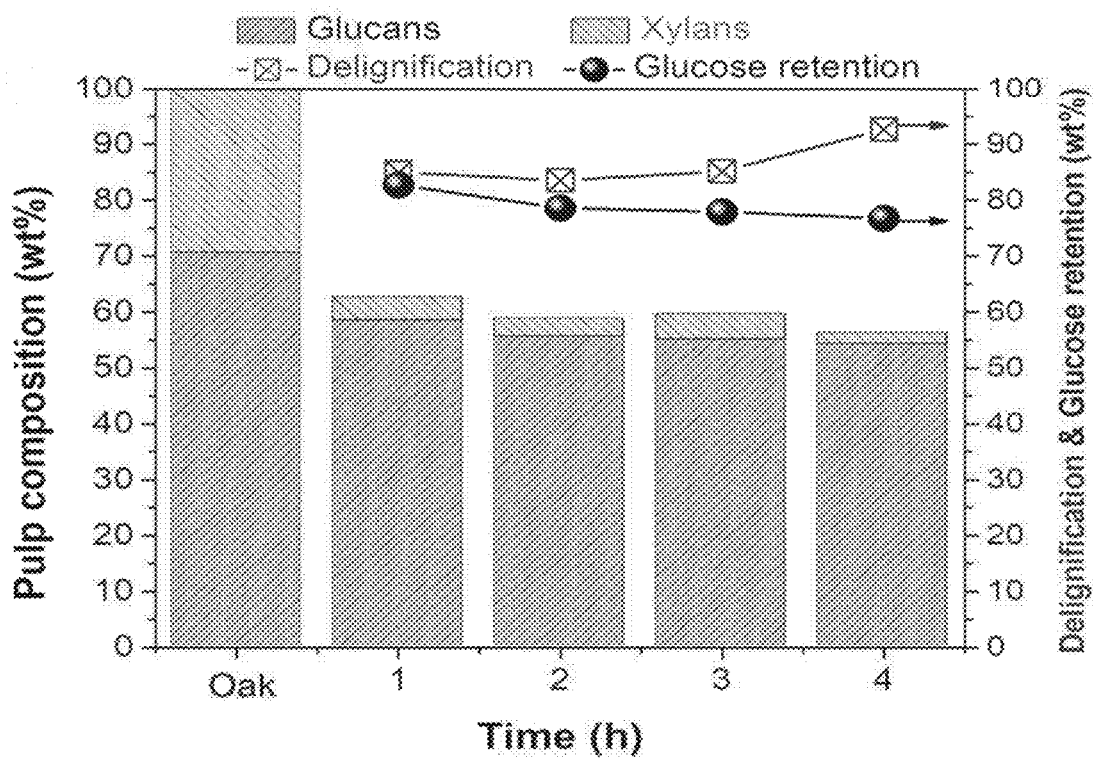
Figure 11C:
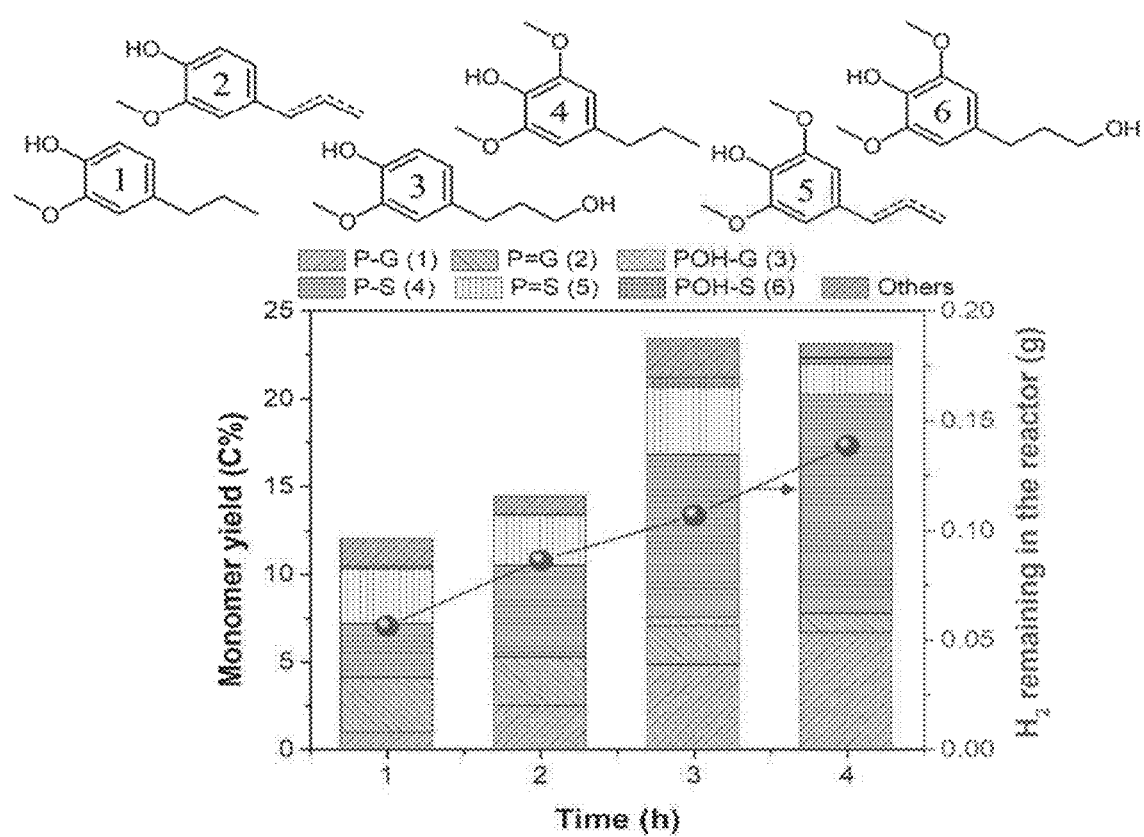

As shown in FIG. 11A, when the conversion reaction was performed for 1 hour, the oak tree was decomposed. Further, referring to FIG. 11B, when the conversion reaction was performed for 1 hour, the delignification degree was high (85.1 wt %), and a considerable amount of glucan was maintained. However, the reaction time of 1 hour was not sufficient to decompose the formic acid (FIG. 11C). Thus, the yield of the aromatic monomer was low (12.0 C %) due to the hydrogen deficiency condition.

In the 4-hour reaction, the DSO yield and the delignification degree increased to 33.1 wt % and 93.4 wt % by a very small amount, respectively, whereas the glucose content was lowered to 76.5 wt %.

However, as shown in FIG. 11C, it was found that during the 4 hour reaction, a large amount of formic acid was decomposed into hydrogen, such that the yield of the aromatic monomer increased to 23.4 C %. This is because P-G (1) and P-S (4) of major aromatic monomer products are produced via the hydrogenation reaction of P=G (2) and P=S as double bonds.

Figure 11D:
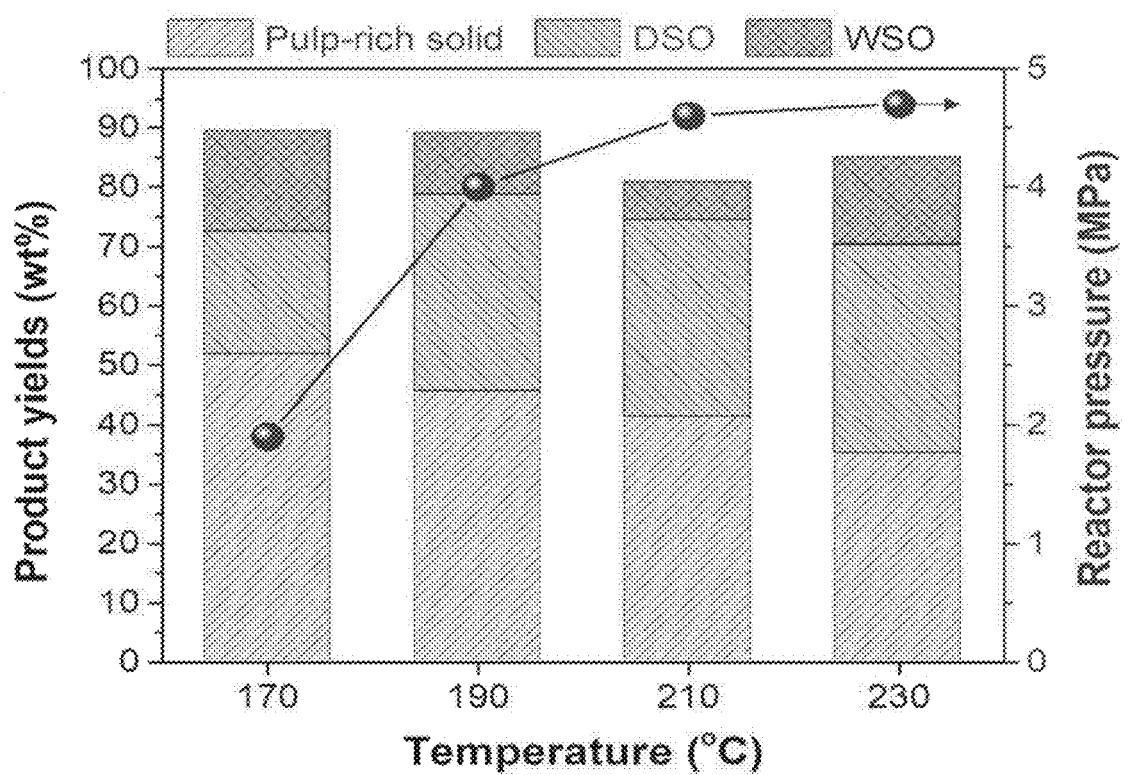
Figure 11E:
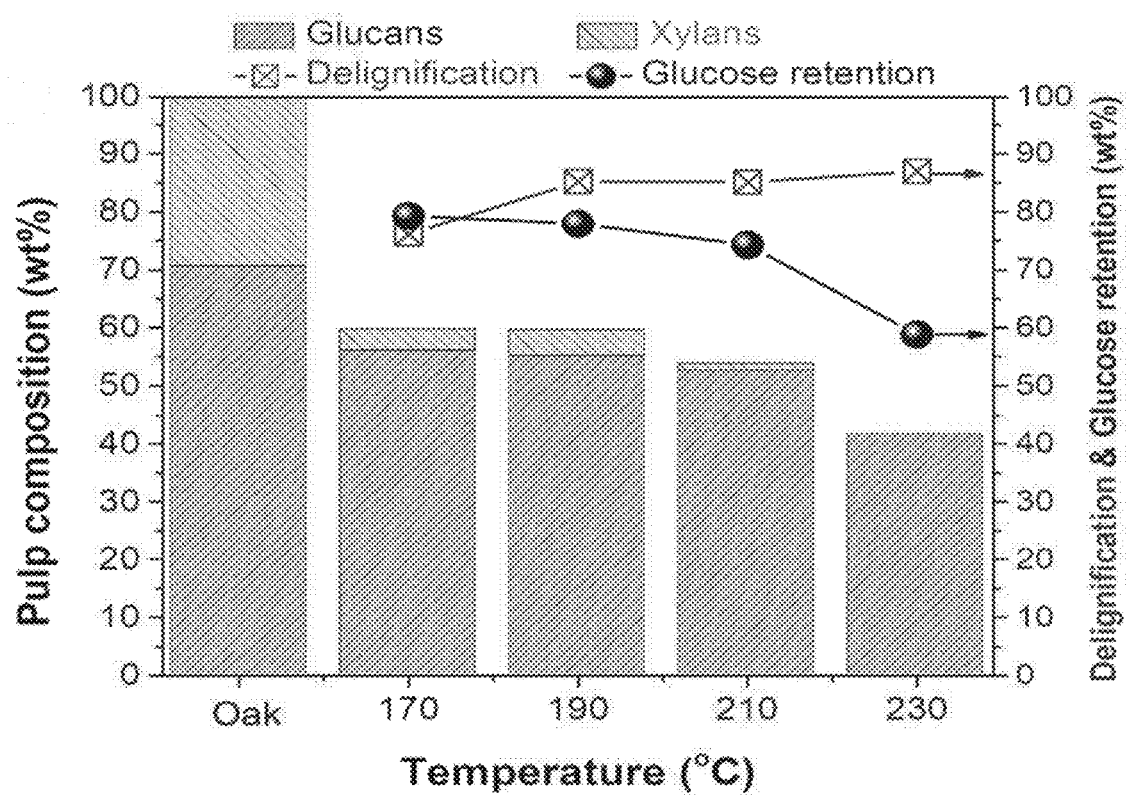
Figure 11F:
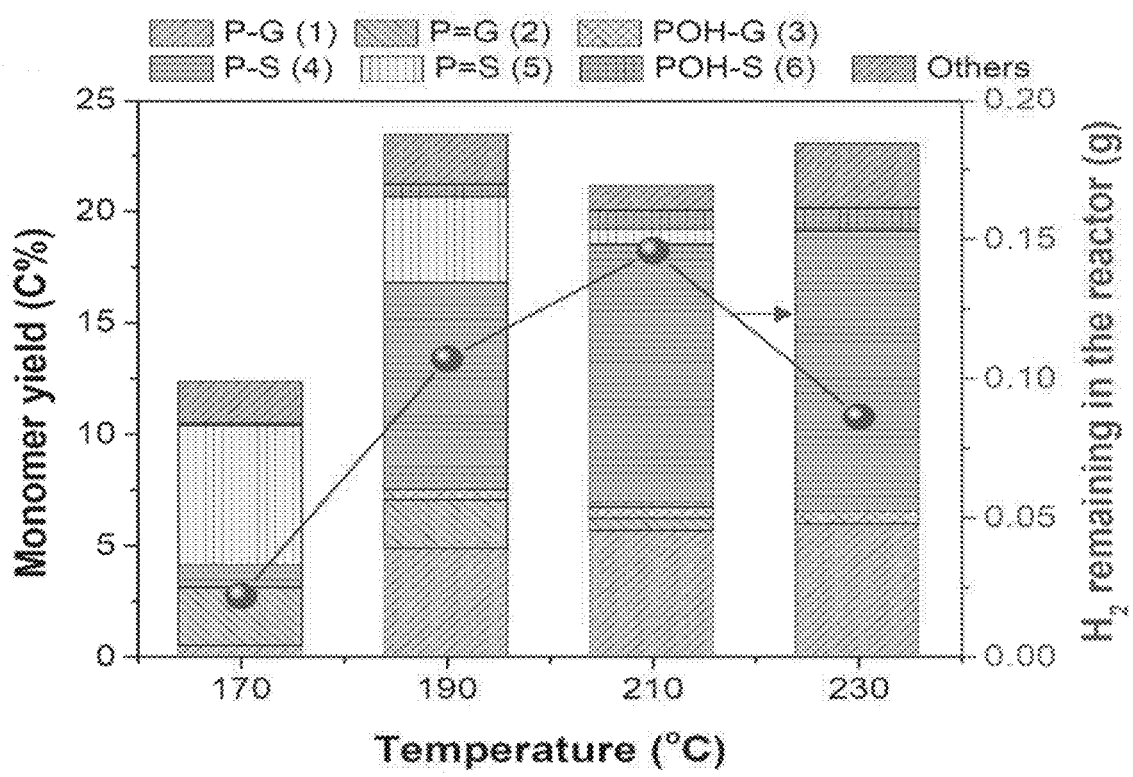

Further, referring to FIGS. 11D-11F, it may be seen that the reaction temperature also plays an important role in the conversion reaction.

Specifically, as the reaction temperature increased from 170° C. to 230° C., the yield of the pulp solid decreased from 51.7 wt % to 35.1 wt %, and the DSO yield increased, and the glucan content decreases from 79.3 wt % to 58.9 wt %. This means that the decomposition of cellulose is increased.

However, when the reaction temperature increased from 190° C. to 230° C., the yield of the aromatic monomer did not increase. Thus, it may be identified that the main products P-G (1) and (P-S (4) were created at low temperatures.

Figure 11G:
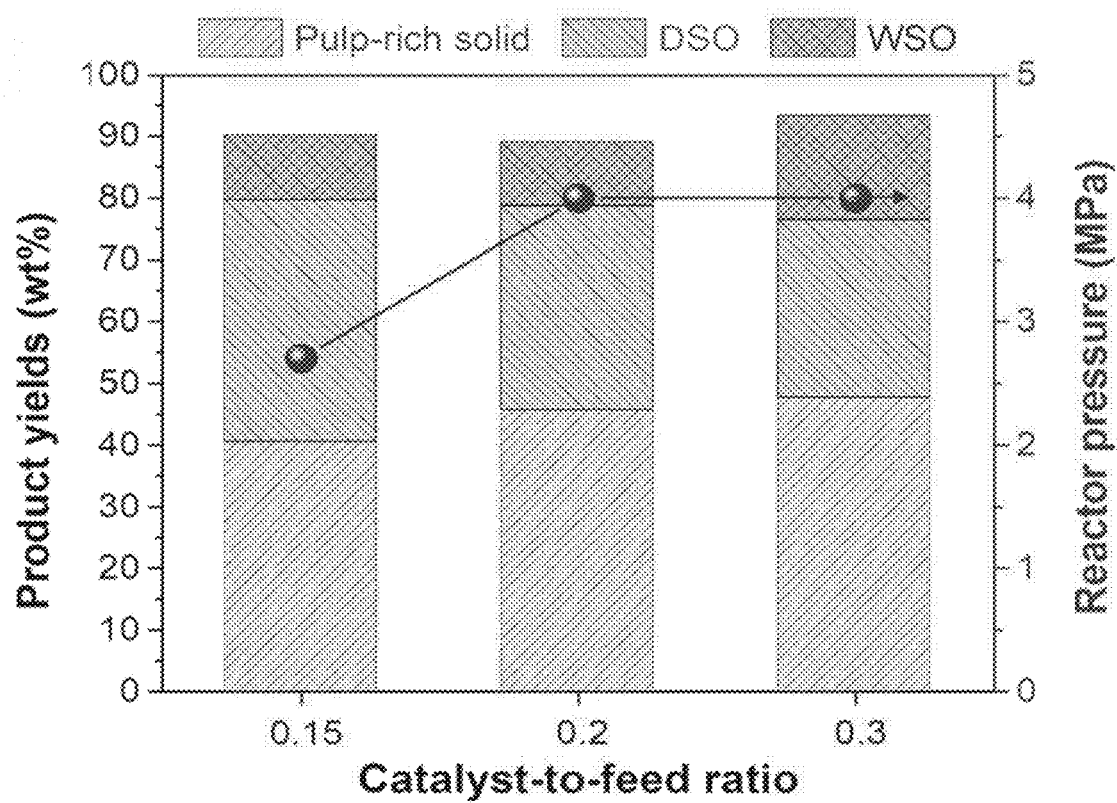
Figure 11H:
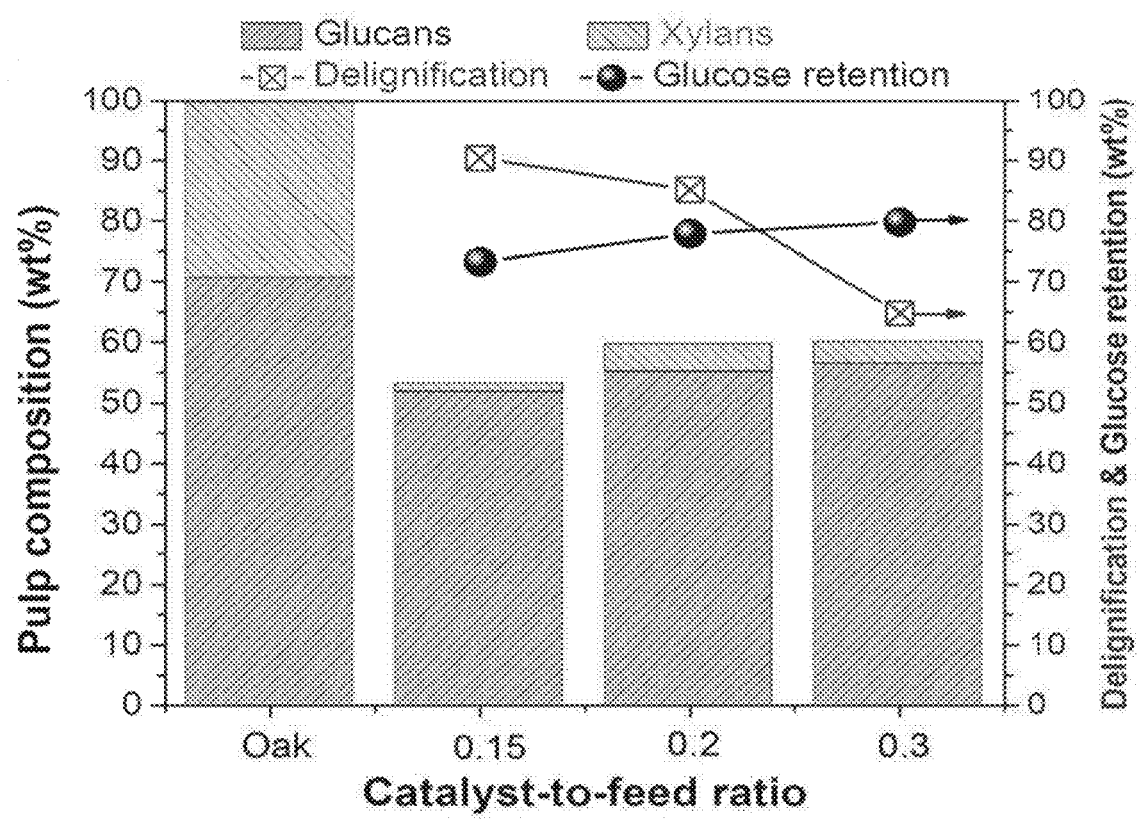
Figure 11I:
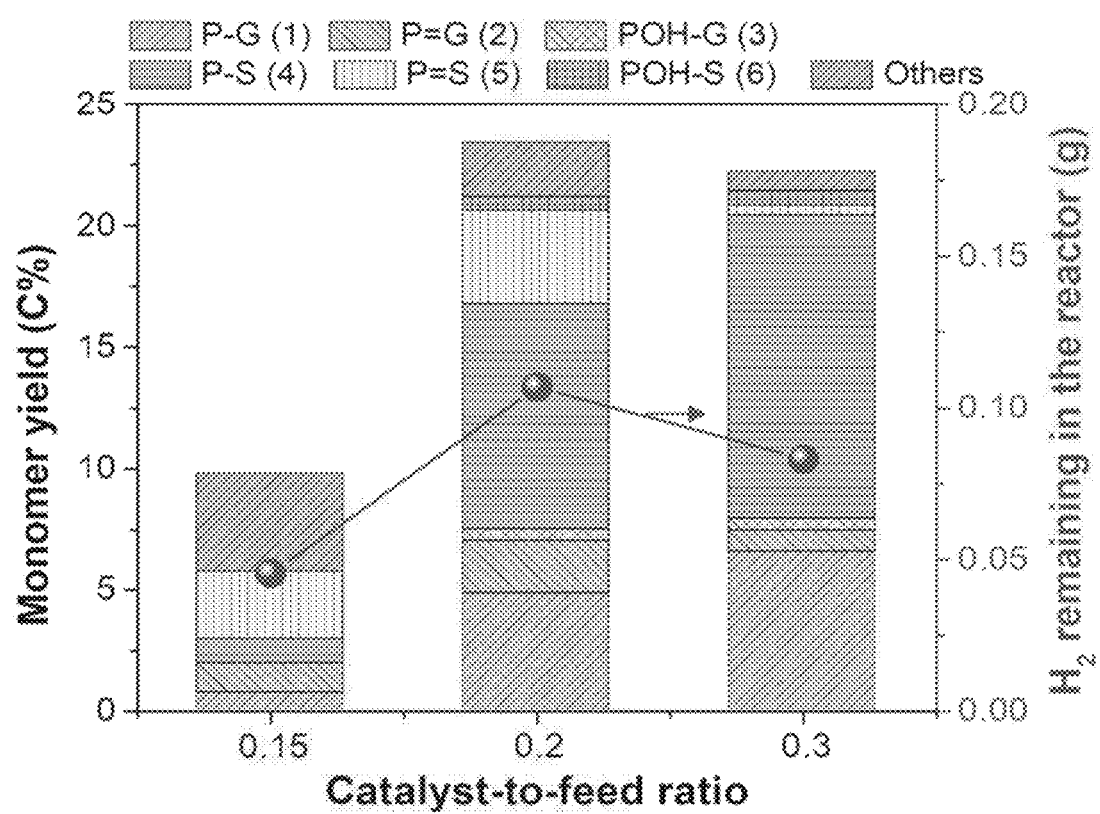

Further, referring to FIGS. 11G-11I, as the catalyst-to-feed ratio increased from 0.15 to 0.3, the yield of the pulp solid increased from 40.3 wt % to 47.5 wt %, and the DSO yield decreased, and the delignification degree decreased from 90.4 wt % to 64.8 wt %.

Therefore, when the delignification degree is reduced at a high catalyst loading amount, the formic acid decomposition is promoted in the solvolysis step, thereby reducing dissociation of ether-ester bonds between carbohydrates and lignin.

When the catalyst-to-feed ratio was 0.2 or higher, the yield of the aromatic monomer was relatively constant (about 22 C %) and was higher than that (about 10 C %) obtained when the catalyst to feed ratio was 0.15. Especially when the catalyst-to-feed ratio was 0.3, the contents of P-G (1) and P-S (4) increased while the content of hydrogen decreased after the reaction. This indicates that double bond hydrogenation was enhanced under a larger catalyst amount condition.

Therefore, when the reaction time is large, the reaction temperature is high, the formic acid is used in a large amount, such that the severity of the reaction increases, the yield of the pulp solid and glucan content therein decreased, while the DSO yield and the delignification degree increased. Under more suitable reaction conditions, the yield of the aromatic monomer reached about 23 C %.

The purpose of the heterogeneous catalyst according to the present disclosure is to mass-produce the aromatic monomers that may be used as high value-added chemicals in "Lignin First Approach" and to collect phase-pure cellulose for the production of biofuels or other biochemicals (e.g., bioethanol, biobutanol, 2,5-dimethyl furan, succinic acid, methyl lactate, Y-butyrolactone, 1,5-pentanediol, 1,6-hexanediol, adipic acid, 2,5-furan dicarboxylic acid).

To this end, the optimum reaction conditions for the $Ni_1$—Al/AC catalyst without external molecular hydrogen are as follows: a reaction time of 3 hours, a temperature of 190° C., and a catalyst to feed ratio of 0.2 In this way, a 45.5 wt % pulp solid having high glucan content (77.9 wt %), low xylan content (15.5 wt %) and low lignin content (14.8 wt %) may be obtained. Further, the aromatic monomer yield 23.4 C % may be obtained such that the aromatic monomer contains 4.8 C % P-G (1), 2.2 C % P=G (2), 0.28 C % P-S (4) and 3.87 C % P=S (5).

In addition, free dimers, trimers and oligomers as by-products of may be used as combustion fuels to produce heat and electricity in industrial environments. WSO may be used to produce biofuels via aqueous phase reforming. Further, the pulp solid may be used to produce fermentable sugars. Therefore, the use of the $Ni_1$—Al/AC catalyst in the absence of hydrogen makes it possible to collect cellulose while selectively producing the aromatic monomers at the high-yield from the woody biomass materials as an economical and practical alternative.

Experimental Example 7

Effect of Catalyst on Conversion Reaction Depending on Type of Woody Biomass Material To investigate the effect of the catalyst of Present Example 2 on the conversion reaction based on types of woody biomass materials, miscanthus, pine, aspen tree, and oak tree which represent grasses, conifers, and deciduous tree were used as woody biomass materials. Conversion was performed in the same manner as in Present Example 1-1. Conversion reaction results are shown in Table 6.

TABLE 6

|  | Product [wt %] | | | Aromatic monomer [C %] | Pulp solid composition [wt %] | | | Delignification degree [wt %] |
| --- | --- | --- | --- | --- | --- | --- | --- | --- |
|  | Pulp | DSO | WSO |  | Glucan | Xylan | Lignin |  |
| Miscanthus | 45.5 | 31.0 | 16.8 | 23.9 | 76.3 | 5.46 | 10.2 | 89.8 |
| Pine | 51.7 | 35.1 | 12.6 | 19.5 | 77.7 | 11.3 | 21.1 | 78.9 |
| Aspen tree | 51.7 | 31.0 | 6.34 | 24.2 | 81.6 | 18.0 | 14.8 | 85.2 |
| Oak tree | 45.5 | 33.1 | 10.5 | 23.4 | 80.5 | 16.0 | 15.3 | 84.7 |

Referring to Table 6, when the miscanthus and aspen tree were used, the delignification degree and the aromatic monomer yield were very similar to those when using the oak tree. However, when using the pine as a raw material, the delignification degree and aromatic monomer yield were lower than those when using the oak tree, the aspen tree, and the miscanthus. This is because the amount of ether bond in the coniferous tree is small.

From this result, it may be identified that lignin depolymerization is mainly achieved by cleavage of β-O-4 bonds associated with ether and ester of natural lignin which has the effect of releasing the aromatic monomers during the conversion reaction.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A heterogeneous catalyst comprising:
   a carrier; and
   a Ni—Al nano-particle supported on the carrier,
   wherein the Ni—Al nano-particle has a core-shell structure in which an amorphous aluminum oxide or reduced aluminum phase is present around a Ni nano-particle.

2. The heterogeneous catalyst of claim 1, wherein the carrier includes activated carbon (AC).

3. The heterogeneous catalyst of claim 1, wherein a Ni/Al molar ratio of the Ni—Al nano-particles is in a range of 0.5 to 3.

4. The heterogeneous catalyst of claim 1, wherein a crystal size of the Ni nano-particle is in a range of 10 to 13 nm.

5. A method for producing a heterogeneous catalyst, the method comprising:
   introducing a carrier, a Ni precursor, and an Al precursor into ultra-pure water, thereby preparing a solution A;
   introducing NaOH and $Na_2CO_3$ into ultra-pure water, thereby preparing a solution B;
   mixing the solution A and the solution B with each other and performing centrifugation of the mixed solution, thereby obtaining a mixture of the carrier and a Ni—Al layered double oxide hydroxide (LDH);

washing and drying the mixture; and firing the dried mixture, wherein the firing is performed for 4 to 8 hours under a flow of 4 to 7% $H_2$/Ar at a temperature of 700 to 900° C.

6. The method of claim 5, wherein the Ni precursor includes at least one selected from the group consisting of $Ni(NO_3)_3.6H_2O$, $NiCl_2.xH_2O$, $Ni(CH_3CO_2)_2.4H_2O$, $(NH_4)_2Ni(SO_4).6H_2O$, $NiBr_2.xH_2O$, $NiBr_2.CH_3OCH_2CH_2OCH_3$, $NiBr_2.O(CH_2CH_2OCH_3)_2$, $NiCO_3.2Ni(OH)_2.4H_2O$, $NiF_2$, $Ni(OH)_2$, $NiI_2$, $NiSO_4.(7H_2O)_6$, $K_2Ni(H_2IO_6)_2$, and $K_2Ni(CN)_4.xH_2O$, and wherein the Al precursor includes at least one selected from the group consisting of $Al(NO_3)_3.9H_2O$, $AlCl_3.xH_2O$, $Al(CH_3CO_2)_3$, $AlBr_3$, $C_4H_8AlCl_3O$, $AlF_3$, $Al(OH)_3.xH_2O$, $AlI_3$, $[CH_3CH(OH)COO]_3Al$, $AlO_4P$, $Al_2(SO_4)_3.xH_2O$, and $AlNH_4(SO_4)_2.12H_2O$.

7. The method of claim 5, wherein the obtaining of the mixture is performed at a temperature in a range of 75° C. and 85° C. for 19 hours to 21 hours.

8. A method for producing a lignin-derived high-substituted aromatic monomer from a woody biomass material, the method comprising:

introducing, into a reactor, a solution containing a heterogeneous catalyst, a woody biomass material, ethanol and formic acid, wherein the heterogeneous catalyst comprises a carrier and a Ni—Al nano-particle supported on the carrier; and increasing a temperature and a pressure inside the reactor to convert lignin of the woody biomass material to an aromatic monomer.

9. The method of claim 8, wherein a Ni/Al molar ratio of the Ni—Al nano-particle is in a range of 0.5 to 3.

10. The method of claim 8, wherein the converting is carried out for 2 hours to 5 hours at a temperature in a range of 170° C. to 250° C. and under a pressure of 0.7 to 1.2 MPa of nitrogen.

11. The method of claim 8, wherein the formic acid is introduced into the reactor at a content of 3 ml to 5 ml based on 1 g of the heterogeneous catalyst.

12. The method of claim 8, wherein the aromatic monomer includes at least one selected from the group consisting of 4-n-propyl guaiacol, 4-n-propenyl guaiacol, 4-n-propanol guaiacol, 4-n-propyl syringol, 4-n-propenyl syringol, and 4-n-propanol syringol.

13. The method of claim 8, wherein the method further comprises, after the conversion, collecting cellulose of the woody biomass material.

* * * * *